United States Patent
Alstad et al.

(10) Patent No.: US 11,346,285 B2
(45) Date of Patent: *May 31, 2022

(54) COMPACT ACCESSORY SYSTEMS FOR A GAS TURBINE ENGINE

(71) Applicant: HONEYWELL INTERNATIONAL INC., Charlotte, NC (US)

(72) Inventors: Shawn Alstad, Peoria, AZ (US); Tomasz Dobosz, Tempe, AZ (US); Rocio Chavez, Mexicali (MX)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,088

(22) Filed: Nov. 23, 2020

(65) Prior Publication Data

US 2021/0087976 A1 Mar. 25, 2021

Related U.S. Application Data

(60) Continuation of application No. 16/057,507, filed on Aug. 7, 2018, now Pat. No. 10,900,419, which is a division of application No. 15/014,097, filed on Feb. 3, 2016, now Pat. No. 10,662,878.

(51) Int. Cl.
| | |
|---|---|
| *F02C 7/32* | (2006.01) |
| *B64C 27/14* | (2006.01) |
| *B64D 41/00* | (2006.01) |
| *F16H 1/22* | (2006.01) |

(52) U.S. Cl.
CPC ............... *F02C 7/32* (2013.01); *B64C 27/14* (2013.01); *B64D 41/00* (2013.01); *F16H 1/222* (2013.01); *F05D 2260/4031* (2013.01); *Y02T 50/40* (2013.01); *Y02T 50/60* (2013.01)

(58) Field of Classification Search
CPC ...... F02C 7/32; F02C 7/36; F05D 2260/4031; F05D 2220/50; B64D 2013/0611; B64D 2033/0213; B64D 2041/002; B64D 41/00; B64C 27/14; F16H 1/22; F16H 1/222
See application file for complete search history.

(56) References Cited

U.S. PATENT DOCUMENTS

| | | |
|---|---|---|
| 2,269,916 A | 1/1942 | Price |
| 2,426,878 A | 9/1947 | Willgoos |
| 2,620,622 A | 12/1952 | Lundberg |

(Continued)

FOREIGN PATENT DOCUMENTS

| | | |
|---|---|---|
| EP | 2123883 A2 | 11/2009 |
| EP | 2455597 A2 | 5/2012 |

(Continued)

*Primary Examiner* — Katheryn A Malatek
(74) *Attorney, Agent, or Firm* — Lorenz & Kopf, LLP

(57) ABSTRACT

An accessory system for a gas turbine engine having a driveshaft is provided. The accessory system includes a towershaft coupled to the driveshaft and driven by the driveshaft. The accessory system also includes a shaft including a first shaft bevel gear coupled to a towershaft bevel gear. The shaft is rotatable by the towershaft. The accessory system includes a first accessory drive shaft having a first accessory bevel gear driven by the shaft. The accessory system also includes a second accessory drive shaft having a second accessory bevel gear driven by the shaft.

16 Claims, 21 Drawing Sheets

(56) References Cited

U.S. PATENT DOCUMENTS

| | | |
|---|---|---|
| 3,589,326 A | 6/1971 | Celli |
| 5,233,886 A | 8/1993 | Bossier, Jr. |
| 5,807,202 A | 9/1998 | Sammataro |
| 6,260,429 B1 | 7/2001 | Andrei |
| 6,626,059 B1 | 9/2003 | Fischer et al. |
| 8,347,637 B2 | 1/2013 | Suciu et al. |
| 8,439,631 B2 | 5/2013 | Bartolomeo et al. |
| 8,490,410 B2 | 7/2013 | Suciu et al. |
| 8,870,538 B2 | 10/2014 | Garcia et al. |
| 2004/0237684 A1 | 12/2004 | Bossler |
| 2005/0211093 A1 | 9/2005 | Latulipe et al. |
| 2009/0038435 A1 | 2/2009 | Lunin |
| 2009/0290976 A1 | 11/2009 | Suciu et al. |
| 2012/0117981 A1 | 5/2012 | Suciu et al. |
| 2012/0308362 A1 | 12/2012 | Eleftheriou |
| 2012/0317991 A1 | 12/2012 | Frost et al. |
| 2013/0062885 A1* | 3/2013 | Taneja ............... F01D 15/10 290/1 A |
| 2013/0145774 A1 | 6/2013 | Duong et al. |
| 2013/0180262 A1 | 7/2013 | Duong |
| 2014/0020506 A1 | 1/2014 | Duong |
| 2015/0308350 A1 | 10/2015 | Dobosz et al. |
| 2015/0352477 A1 | 12/2015 | Fujii et al. |
| 2016/0138414 A1 | 5/2016 | Armange |
| 2016/0245183 A1 | 8/2016 | Viel et al. |

FOREIGN PATENT DOCUMENTS

| | | |
|---|---|---|
| FR | 3006733 A1 | 12/2014 |
| FR | 3017660 A1 | 8/2015 |
| WO | 2014130239 A2 | 8/2014 |
| WO | 2014195632 A1 | 12/2014 |

* cited by examiner

COMPACT ACCESSORY SYSTEMS FOR A GAS TURBINE ENGINE

CROSS-REFERENCE TO RELATED APPLICATION

This application is a continuation of U.S. patent application Ser. No. 16/057,507 filed on Aug. 7, 2018, which is a divisional of U.S. patent application Ser. No. 15/014,097 filed on Feb. 3, 2016 and issued as U.S. Pat. No. 10,662,878. The relevant disclosure of each of the above applications is incorporated herein by reference.

TECHNICAL FIELD

The present disclosure generally relates to gas turbine engines, and more particularly relates to compact accessory systems for a gas turbine engine, such as a compact accessory gearbox for use with a gas turbine engine.

BACKGROUND

Gas turbine engines may be employed to power various devices. For example, a gas turbine engine may be employed to power a mobile platform, such as an aircraft. Typically, gas turbine engines include accessories that assist in engine operation and in the operation of the mobile platform, which are driven by the gas turbine engine. The accessories are generally positioned within an engine nacelle. The arrangement of the accessories in the engine nacelle influences the size of the engine nacelle, which may increase drag on the mobile platform.

Accordingly, it is desirable to provide compact accessory systems for a gas turbine engine, which includes a compact accessory gearbox having a reduced size that enables a reduction in a volume of an engine nacelle. Furthermore, other desirable features and characteristics of the present invention will become apparent from the subsequent detailed description and the appended claims, taken in conjunction with the accompanying drawings and the foregoing technical field and background.

SUMMARY

In various embodiments, provided is an accessory system for a gas turbine engine having a driveshaft with an axis of rotation. The accessory system includes a towershaft coupled to the driveshaft and driven by the driveshaft along a towershaft axis of rotation transverse to the axis of rotation of the gas turbine engine. The towershaft includes a towershaft bevel gear at a distal end. The accessory system also includes a shaft including a first shaft bevel gear coupled to the towershaft bevel gear. The shaft is rotatable by the towershaft along a shaft axis of rotation. The shaft axis of rotation is transverse to the towershaft axis of rotation and substantially parallel to the axis of rotation of the gas turbine engine. The accessory system includes a first accessory drive shaft having a first accessory bevel gear driven by the shaft, and the first accessory drive shaft has a first accessory axis of rotation. The accessory system also includes a second accessory drive shaft having a second accessory bevel gear driven by the shaft. The second accessory drive shaft has a second accessory axis of rotation, and each of the first accessory axis of rotation and the second accessory axis of rotation are substantially transverse to the shaft axis of rotation. The secondary accessory axis of rotation and the first accessory axis of rotation are substantially transverse to each other.

Also provided according to various embodiment is an accessory system for a gas turbine engine having a driveshaft with an axis of rotation. The accessory system includes a towershaft coupled to the driveshaft and driven by the driveshaft along a towershaft axis of rotation transverse to the axis of rotation of the gas turbine engine. The towershaft includes a towershaft bevel gear at a distal end. The accessory system comprises a shaft including a first shaft bevel gear coupled to the towershaft bevel gear, and the shaft is rotatable by the towershaft along a shaft axis of rotation. The shaft axis of rotation is transverse to the towershaft axis of rotation and substantially parallel to the axis of rotation of the gas turbine engine. The shaft includes a second shaft bevel gear spaced apart from a third shaft bevel gear by a spacer. The accessory system also includes a first accessory drive shaft having a first accessory bevel gear coupled to the second shaft bevel gear, and the first accessory drive shaft has a first accessory axis of rotation. The accessory system includes a second accessory drive shaft having a second accessory bevel gear coupled to the third shaft bevel gear. The second accessory drive shaft has a second accessory axis of rotation, and each of the first accessory axis of rotation and the second accessory axis of rotation are substantially transverse to the shaft axis of rotation. The secondary accessory axis of rotation and the first accessory axis of rotation are substantially transverse to each other.

Further provided according to various embodiments is an accessory system for a gas turbine engine having a driveshaft with an axis of rotation. The accessory system includes a towershaft coupled to the driveshaft and driven by the driveshaft along a towershaft axis of rotation transverse to the axis of rotation of the gas turbine engine. The towershaft includes a towershaft bevel gear at a distal end. The accessory system includes a shaft including a first shaft bevel gear coupled to the towershaft bevel gear. The shaft is rotatable by the towershaft along a shaft axis of rotation, and the shaft axis of rotation is transverse to the towershaft axis of rotation and substantially parallel to the axis of rotation of the gas turbine engine. The accessory system also includes a first accessory drive shaft having a first accessory bevel gear driven by the shaft, and the first accessory drive shaft has a first accessory axis of rotation. The accessory system includes a second accessory drive shaft having a second accessory bevel gear driven by the shaft. The second accessory drive shaft has a second accessory axis of rotation, and each of the first accessory axis of rotation and the second accessory axis of rotation are substantially transverse to the shaft axis of rotation. The secondary accessory axis of rotation and the first accessory axis of rotation are substantially transverse to each other, and the first accessory axis of rotation intersects the shaft axis of rotation at a first point and the second accessory axis of rotation intersects the shaft axis of rotation at a second point. The accessory system includes a third accessory drive shaft having a third accessory bevel gear driven by the shaft. The third accessory drive shaft has a third accessory axis of rotation, and the third accessory axis of rotation intersects the shaft axis of rotation at a third point, with the second point different than the first point and the third point.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of gearbox that would benefit from a reduced or compact configuration, and that the accessory systems and methods described herein for use with a gas turbine engine is merely one exemplary embodiment according to the present disclosure. Moreover, while the accessory systems and methods are described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
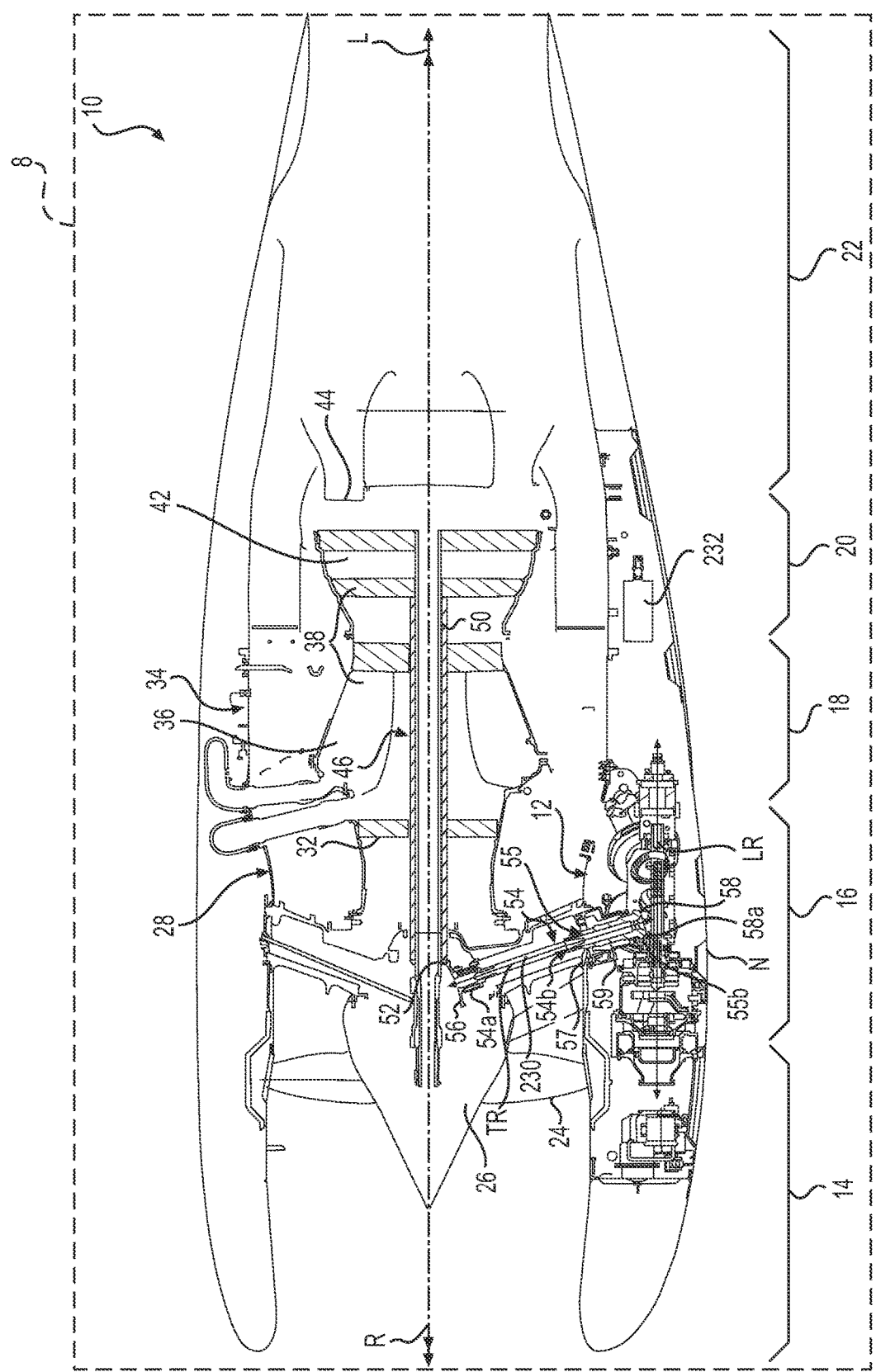
FIG. 1 is a schematic cross-sectional illustration of a gas turbine engine, which includes an exemplary compact accessory system including an exemplary compact accessory gearbox in accordance with the various teachings of the present disclosure.

With reference to FIG. 1, a cross-sectional view of an exemplary gas turbine engine 10 is shown, which includes a compact accessory system 12 according to various embodiments. It should be noted that while the compact accessory system 12 is discussed herein with regard to the gas turbine engine 10, the compact accessory system 12 can be employed with any suitable engine, such as a turbojet engine, an auxiliary power unit (APU), etc. Thus, the following description is merely one exemplary use of the compact accessory system 12. Moreover, while the gas turbine engine 10 is described herein as being used with a mobile platform, such as an aircraft 8, it will be understood that the gas turbine engine 10 may be used with any suitable platform, whether mobile or stationary.

In this example, the gas turbine engine 10 includes a fan section 14, a compressor section 16, a combustor section 18, a turbine section 20, and an exhaust section 22. The fan section 14 includes a fan 24 mounted on a rotor 26 that draws air into the gas turbine engine 10 and accelerates it. A fraction of the accelerated air exhausted from the fan 24 is directed through an outer (or first) bypass duct 28 and the remaining fraction of air exhausted from the fan 24 is directed into the compressor 32.

In the embodiment of FIG. 1, the compressor section 16 includes a compressor 32. However, in other embodiments, the number of compressors in the compressor section 16 may vary. In the depicted embodiment, the compressor 32 raises the pressure of the air and directs the high pressure air into the combustor 36. A fraction of the air bypasses the combustor 36 and enters a second bypass duct 34.

In the embodiment of FIG. 1, in the combustor section 18, which includes an annular combustor 36, the high pressure air is mixed with fuel and combusted. The high-temperature combusted air is then directed into the turbine section 20. The turbine section 20 includes three turbines disposed in axial flow series, namely, a high pressure turbine 38 and a low pressure turbine 42. However, it will be appreciated that the number of turbines, and/or the configurations thereof, may vary. In this embodiment, the high-temperature combusted air from the combustor section 18 expands through and rotates each turbine 38 and 42. The air is then exhausted through a propulsion nozzle 44 disposed in the exhaust section 22. As the turbines 38 and 42 rotate, each drives equipment in the gas turbine engine 10 via concentrically disposed shafts or spools. In one example, the high pressure turbine 38 drives the compressor 32 via a high pressure driveshaft 46 and the low pressure turbine 42 drives the fan 24 via a low pressure driveshaft 50. Generally, the high pressure driveshaft 46 and the low pressure driveshaft 50 are coaxially arranged along a longitudinal axis L of the gas turbine engine 10, and each of the high pressure driveshaft 46 and the low pressure driveshaft 50 have an axis of rotation R, which extends substantially parallel to and along the longitudinal axis L.

In the example of FIG. 1, the high pressure driveshaft 46 includes a gear 52. In this example, the gear 52 is a bevel gear, having a plurality of bevel gear teeth. The gear 52 is coupled to a towershaft 54 and drives the towershaft 54. In one example, the towershaft 54 includes a first end 54a and a second end 54b. The first end 54a includes a gear 56, which in this example, comprises a bevel gear. The gear 56 includes a plurality of bevel gear teeth, which are meshingly coupled to or engaged with the plurality of bevel gear teeth of the gear 52. The engagement of gear 56 with gear 52 transfers torque from the high pressure driveshaft 46 to the towershaft 54, and thus, drives or rotates the towershaft 54. The towershaft 54 is generally coupled to the gear 52 such that the towershaft 54 extends along an axis of rotation Tr, which is substantially transverse to the axis of rotation R of the high pressure driveshaft 46. One or more bearings or supports may be coupled to the towershaft 54 at or near the first end 54a to support the towershaft 54 for rotation with the gear 56.

The second end 54b of the towershaft 54 is coupled to the compact accessory system 12 and forms part of the compact accessory system 12. In one example, the second end 54b of the towershaft 54 includes a sleeve 55. The sleeve 55 is coupled about the second end 54b via splined coupling, for example, although any suitable joining technique may be employed such that the sleeve 55 rotates in unison with the towershaft 54. The sleeve 55 may be supported for rotation by a bearing 57, which is disposed in a housing 59. The housing 59 couples the second end 55b of the sleeve 55 to the compact accessory gearbox 60 and the bearing 57 supports the sleeve 55 for rotation relative to a compact accessory gearbox 60. The sleeve 55 further includes a gear 58, such as a bevel gear. The gear 58 is disposed at a second end 55b of the sleeve 55, and includes a plurality of bevel gear teeth 58a. The plurality of bevel gear teeth 58a are coupled about a perimeter or circumference of the gear 58. The gear 58 is coupled to the compact accessory system 12, and the plurality of bevel gear teeth 58a meshingly engage a bevel gear contained within the compact accessory gearbox 60 as will be discussed further herein. Generally, the gear 58 transfers torque from the sleeve 55 and the towershaft 54 to the compact accessory gearbox 60 to drive various components of the compact accessory system 12. However, during an engine startup, power is delivered from a starter turbine 64 (with air supplied by a starter valve 62) and into compact accessory gearbox 60 at the correct speed (in revolutions per minute (rpm)), driving the sleeve 55 and the towershaft 54, which drives the high pressure driveshaft 46 and turns the compressor 32 and high pressure turbine 38 of the gas turbine engine 10 allowing the gas turbine engine 10 to start. The compact accessory system 12, in turn, drives various accessories associated with the gas turbine engine 10. In one example, the compact accessory system 12 is mounted within a nacelle N of the gas turbine engine 10.

Figure 2:
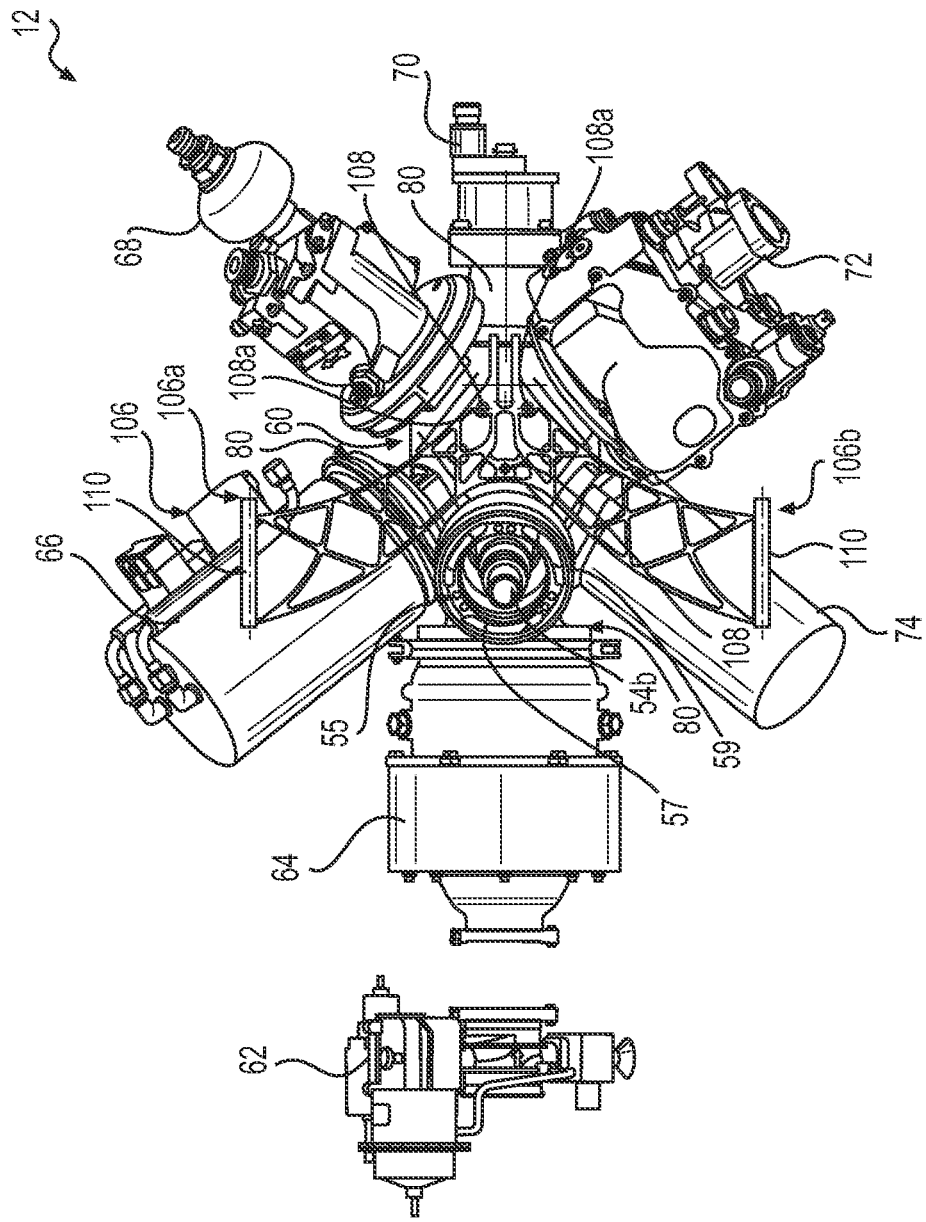
FIG. 2 is a top view of the compact accessory system of FIG. 1.
Figure 3:
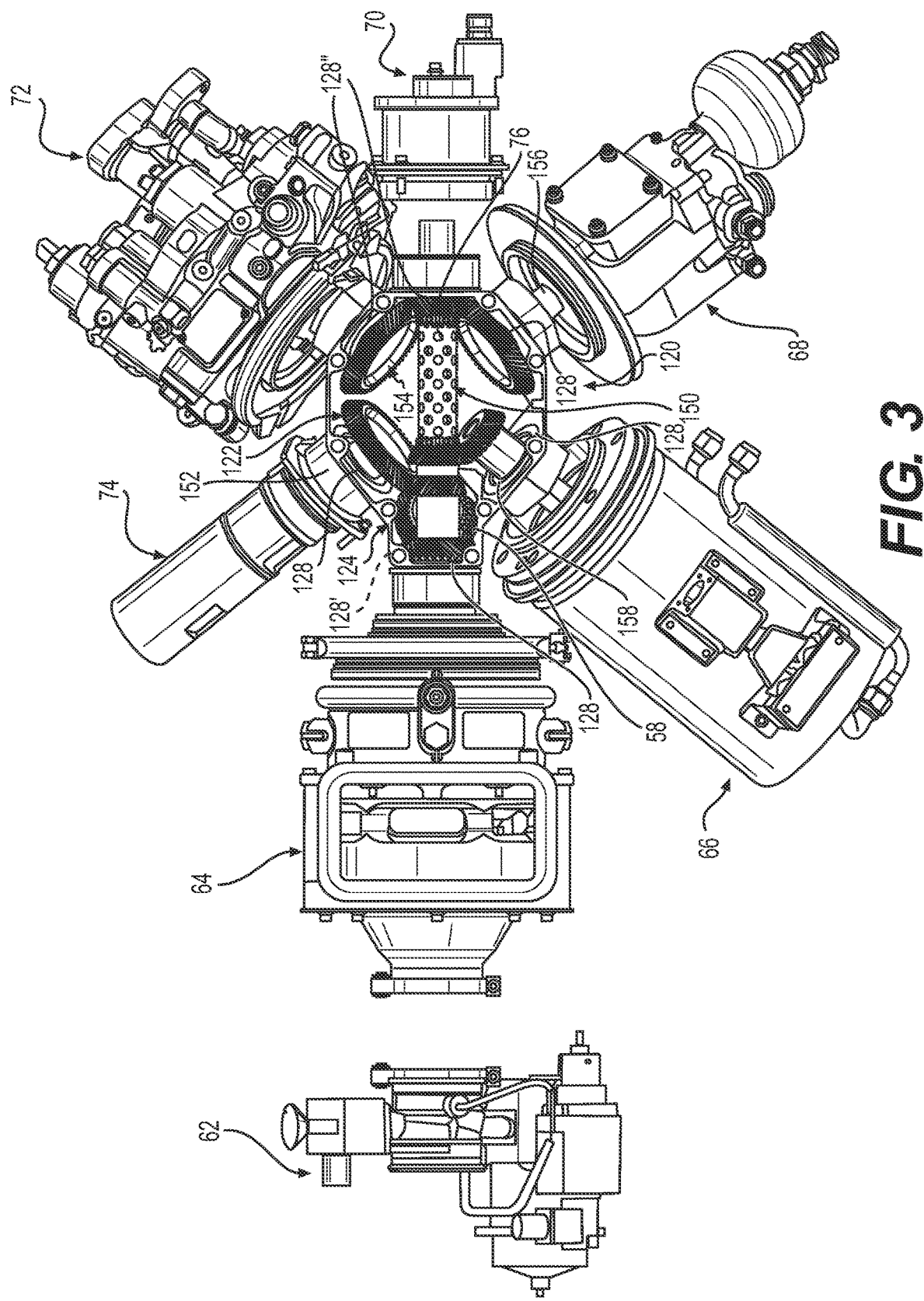
FIG. 3 is a bottom view of the compact accessory system of FIG. 1, with a portion of the compact accessory gearbox removed.

With reference to FIG. 2, the compact accessory system 12 is shown in greater detail. In this example, the compact accessory system 12 includes the compact accessory gearbox 60, which drives various accessories, including, but not limited to, a starter turbine 64, a direct-current (DC) generator 66, a hydraulic pump 68, a permanent magnet alternator 70, a fuel control unit 72, a lubrication pump 74 and an air-oil separator 76 (FIG. 3). The starter valve 62 supplies air to the starter turbine 64. Generally, the compact accessory gearbox 60 is coupled to the towershaft 54 via the gear 58 to receive the torque from the towershaft 54 and to drive the accessories 62-76. It should be noted that the accessories 62-76 described herein are merely exemplary, as the compact accessory gearbox 60 may be used to drive any suitable accessory associated with the gas turbine engine 10. With brief reference to FIGS. 4-6, the accessories 64-74 can be coupled to the compact accessory gearbox 60 via an adaptor 80.

Figure 5:
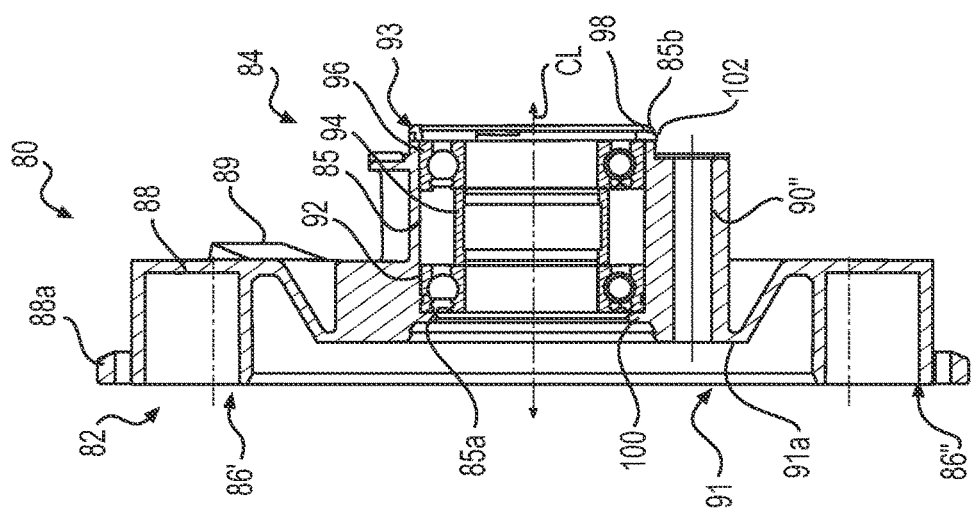
FIG. 5 is a cross-sectional view of the adaptor of FIG. 4, taken along line 5-5 of FIG. 4.
Figure 4:
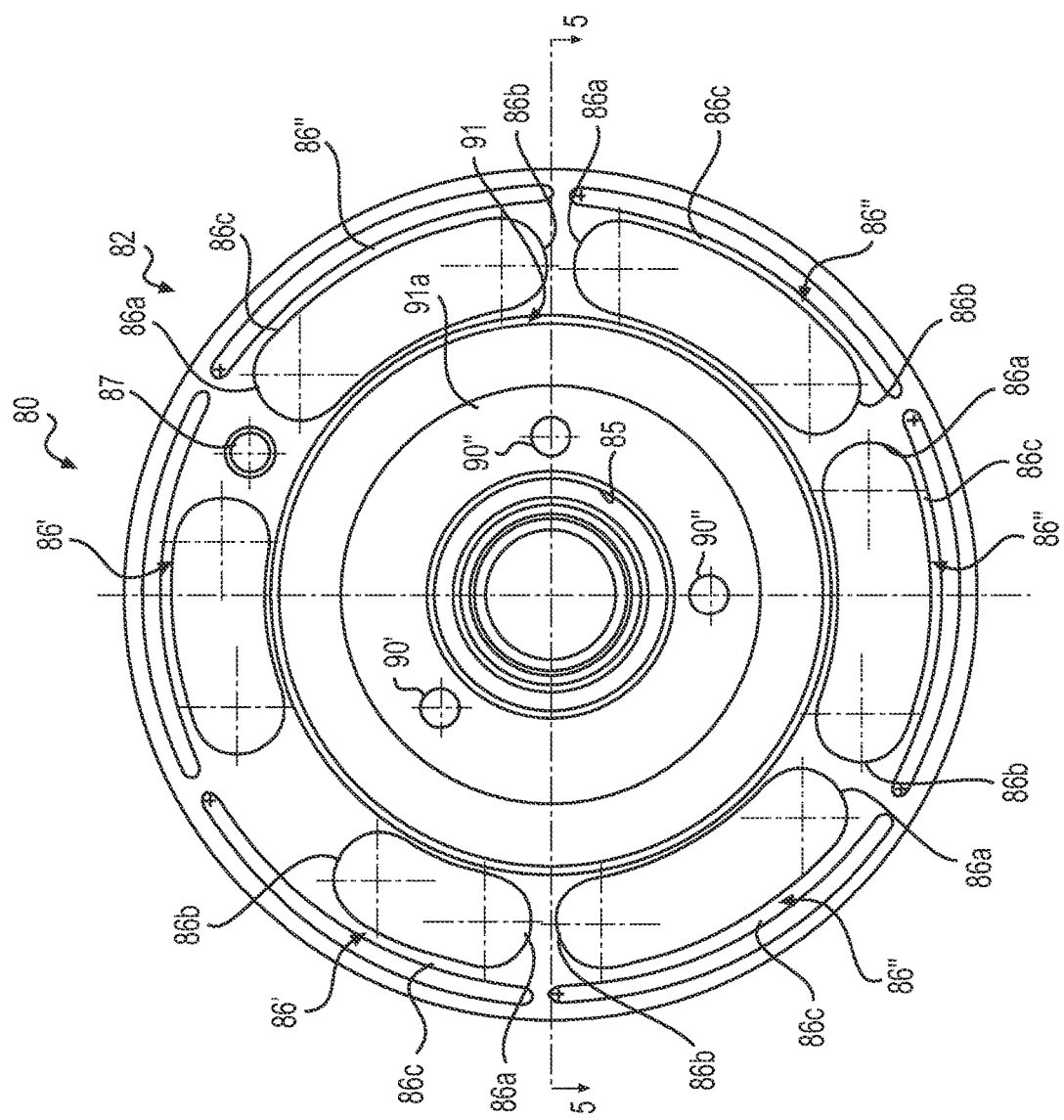
FIG. 4 is a front view of an exemplary adaptor for use with the compact accessory system of FIG. 1.

With reference to FIGS. 4 and 5, the adaptor 80 includes an accessory interface 82 and a gearbox interface 84 (FIG. 5), which are interconnected via a central bore 85. The adaptor 80 is composed of any suitable material, and in one example, is composed of a metal or metal alloy. The adaptor 80 may be formed via casting, stamping, machining, etc. The accessory interface 82 is generally opposite the gearbox interface 84 (FIG. 5). The accessory interface 82 is generally circular, however, the accessory interface 82 may have any desired shape to couple the respective accessory 64-74 to the compact accessory gearbox 60.

In one example, the accessory interface 82 includes a first plurality of mounting bores 86. The first plurality of mounting bores 86 are spaced apart along a perimeter or circumference of the accessory interface 82. In one example, the mounting bores 86 comprise mounting slots, which are elongated about the circumference of the accessory interface 82. In this example, two mounting fasteners (not shown) may be received in each of the mounting bores 86, with one of the mounting fasteners received in a first end 86a of the mounting bore 86, and another of the mounting fasteners received in a second end 86b of the mounting bore 86. While not illustrated herein for clarity, the mounting fasteners comprise any suitable coupling device for coupling the accessory 62-74 to the adaptor 80, including, but not limited to, a mechanical fastener assembly including a threaded shank that engages a nut disposed about a surface 86c of the mounting bores 86, etc. In addition, one of the mounting bores 86' may have an arcuate length about the perimeter of the accessory interface 82 that is different than an arcuate length of a reminder of the mounting bores 86". In this example, the arcuate length of the mounting bore 86' is less than the arcuate length of the mounting bores 86" to aid in the alignment of the respective accessory 64-72 to the adaptor 80. Generally, with reference to FIG. 5, the mounting bores 86 extend through an outer surface of the accessory interface 82 and terminate at a base 88 of the accessory interface 82. A v-band flange 88a may also be coupled to the adaptor 80, which may engage a corresponding v-band flange associated with one or more of the accessories 64-72. The v-band flange 88a allows the accessory 64-72 with the corresponding or opposing v-band flange to be connected to the adaptor 80 using a v-band clamp.

Figure 6:
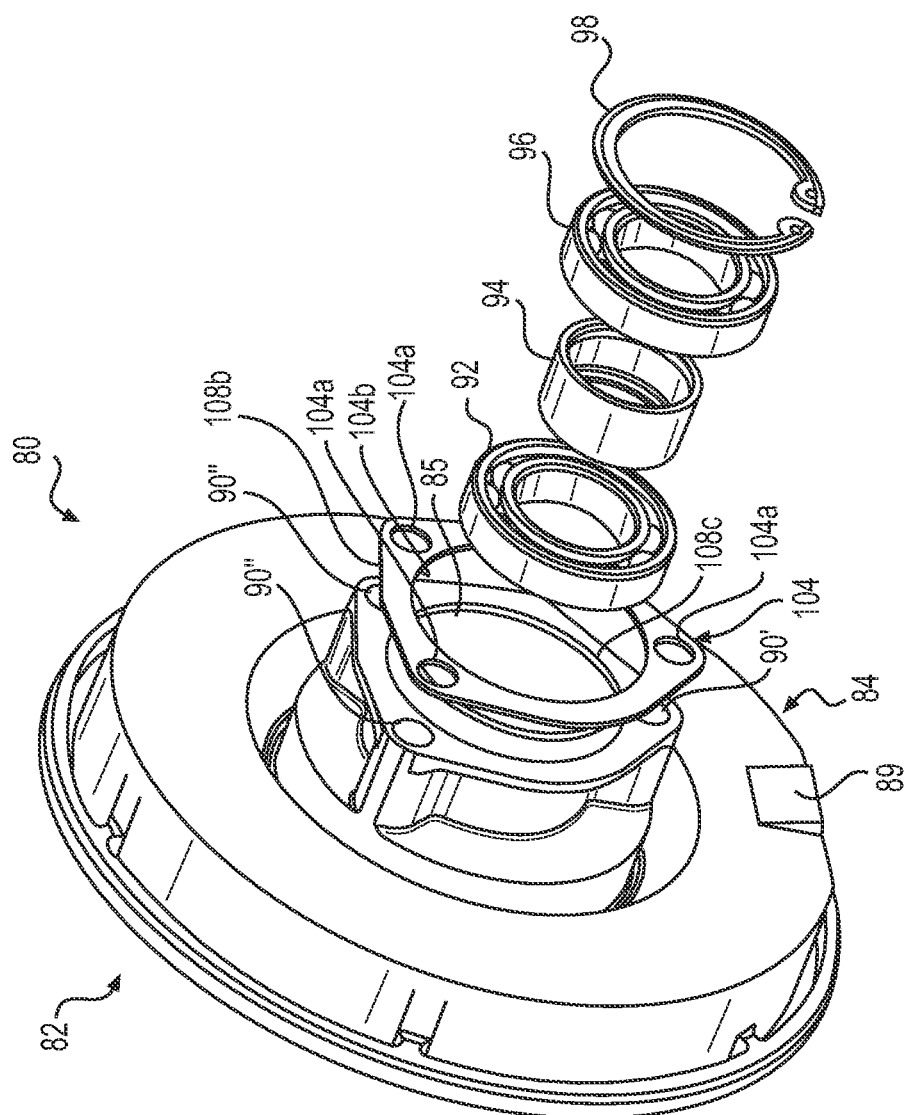
FIG. 6 is an exploded perspective view of an exemplary bearing assembly for use with the compact accessory system of FIG. 1.

In addition, with reference to FIG. 4, the accessory interface 82 may include a piloting bore 87. The piloting bore 87 may receive a piloting screw or other device to assist in locating the respective accessory 64-72 on the accessory interface 82. The piloting bore 87 generally terminates at the base 88, as illustrated in FIG. 6. With continued reference to FIG. 6, the accessory interface 82 also includes a projection 89, which adds material for a breather port defined through the adaptor 80. The projection 89 is coupled to the base 88 of the accessory interface 82, so as to be on a side of the base 88 substantially opposite the mounting bores 86.

With reference to FIGS. 5 and 6, the gearbox interface 84 couples the compact accessory gearbox 60 to the adaptor 80. The gearbox interface 84 is generally circular, and has a diameter, which is different than a diameter of the accessory interface 82. The diameter of the gearbox interface 84 is generally smaller than the accessory interface 82. The gearbox interface 84 includes a second plurality of mounting bores 90, which pass through the gearbox interface 84 and terminate along a surface 91a of a counterbore 91 defined through the accessory interface 82. The mounting bores 90 are generally cylindrical, but the mounting bores 90 may have any desired shape. The mounting bores 90 are generally spaced apart about a perimeter or circumference of the gearbox interface 84. In one example, one of the mounting bores 90' is spaced a greater distance apart from a reminder of the plurality of mounting bores 90" to aid in the assembly, clocking and coupling of the adaptor 80 to the compact accessory gearbox 60; however, the mounting bores 90 may be evenly spaced. In this example, the gearbox interface 84 defines three mounting bores 90; however, the gearbox interface 84 may include any number of mounting bores 90. The mounting bores 90 each receive a suitable mechanical fastener, such as a bolt, etc., which tightens against a nut or nutplate received on the surface 92a, for example, to couple the adaptor 80 to the compact accessory gearbox 60.

With reference to FIG. 5, the central bore 85 is defined about a central axis CL of the adaptor 80. In this example, the central bore 85 is sized to receive a bearing assembly 93, which includes a first bearing 92, a spacer 94, a second bearing 96 and a retaining ring 98. The central bore 85 includes a lip 100 at a first end 85a, which serves to retain the first bearing 92 within the central bore 85. The central bore 85 also defines a recess 102 at a second end 85b, which receives the retaining ring 98 to retain the bearing assembly 93 within the central bore 85. Generally, the bearing assembly 93 enables a respective shaft of the compact accessory gearbox 60 to rotate within the adaptor 80 to drive the respective accessory 64-72. The first bearing 92 and the second bearing 96 each generally comprise a ball bearing, roller bearing, duplex, air, or any other type of bearing, as known to one of skill in the art. The spacer 94 comprises any suitable spacer, and in one example, comprises a metal ring that is received between the first bearing 92 and the second bearing 96. The retaining ring 98 comprises a metal retaining ring, which is elastically deformable to enable the retaining ring 98 to be removably coupled to the central bore 85.

With reference to FIG. 6, a piloting flange 108c is coaxial with the central bore 85 to assist in aligning the bearing assembly 93 within the central bore 85 and with a plurality of apertures 128 of a housing or gear case 120 of the compact accessory gearbox 60. In one example, a gasket 104 includes a plurality of mounting bores 104a that coaxially align with the plurality of mounting bores 90 to enable the mechanical fastening assembly associated with the gearbox interface 84 to pass through the mounting bores 104a and couple a flange 108b with the gasket 104 and the gearbox interface 84. The piloting flange 108c also defines a central bore 104b, which is sized to be positioned about the central bore 85.

With reference back to FIGS. 2 and 3, as the accessories 62-74 are generally known to one skilled in the art, the accessories 62-74 will not be discussed in great detail herein. Briefly, however, the starter valve 62 receives pressurized air from an auxiliary power unit (APU) associated with the aircraft 8 to supply air to the starter turbine 64. The starter turbine 64 is coupled to the starter valve 62, and to the compact accessory gearbox 60. The starter turbine 64 converts the pressurized air from the APU into rotational energy, which is used to drive the towershaft 54, which via the gears 56, 52, drives the high pressure driveshaft 46, and thus, the compressor 32 and the high pressure turbine 38 for starting the gas turbine engine 10 (FIG. 1). The direct-current (DC) generator 66 is coupled to the compact accessory gearbox 60, and is driven to convert mechanical energy received from the towershaft 54 into electricity to power various electrical items onboard the aircraft 8. The hydraulic pump 68 is coupled to the compact accessory gearbox 60 and is driven to provide high pressure hydraulic fluid to one or more hydraulic components of the aircraft 8 and to power a hydraulically actuated thrust reverser associated with the gas turbine engine 10. The permanent magnet alternator 70 is coupled to the compact accessory gearbox 60, and is driven to provide alternating current (AC) power to an engine control unit associated with the gas turbine engine 10. The fuel control unit 72 is coupled to the compact accessory gearbox 60 and is driven to provide fuel to the combustor 36 of the gas turbine engine 10 (FIG. 1). The fuel control unit 72 includes, but is not limited to, a hydromechanical fuel control unit, an electronic fuel control unit, a full authority digital engine control (FADEC), etc. The lubrication pump 74 is coupled to the compact accessory gearbox 60 and driven to provide oil at the desired operating pressure to various portions of the gas turbine engine 10. With reference to FIG. 3, the air-oil separator 76 is contained wholly within the compact accessory gearbox 60, and forms part of a gear train 122 associated with the compact accessory gearbox 60. The air-oil separator 76 is driven to separate air from oil within the compact accessory gearbox 60.

With reference to FIG. 2, the compact accessory gearbox 60 is coupled to the gas turbine engine 10 via one or more supports or struts 106. In this example, the compact accessory gearbox 60 is coupled via two struts 106a, 106b, which extend outwardly from the compact accessory gearbox 60 in a generally V-shape. The struts 106a, 106b are composed of a suitable high strength material, such as a metal or metal alloy. The struts 106a, 106b include one or more mounting bores 108 that receive a mechanical fastener 108a, such as a bolt, to couple the struts 106a, 106b to the compact accessory gearbox 60. The struts 106a, 106b also include a platform 110, which couples the struts 106a, 106b to the gas turbine engine 10. For example, the platform 110 may define one or bores for receipt of a mechanical fastener to couple the struts 106a, 106b to the gas turbine engine 10. Alternatively, the platform 110 may provide a surface for spot welding the struts 106a, 106b. As a further example, the platform 110 may be received in slots or interference-fit into a portion of the gas turbine engine 10.

With reference to FIG. 3, a bottom view of the compact accessory system 12 is shown with the adaptors 80 removed from the accessories 62-74 for clarity. The compact accessory gearbox 60 includes the housing or gear case 120 and the gear train 122. In this example, the gear case 120 comprises a two-piece housing, with a first portion 124 and a second portion 126 (FIG. 9; the second portion 126 is removed in FIG. 3 to illustrate the gear train 122). The gear case 120 is composed of a metal, metal alloy or composite. The first portion 124 and the second portion 126 are formed through any suitable technique, such as casting, forging, machining, stamping, fiber layup, etc. Generally, the first portion 124 comprises the plurality of apertures 128 to couple the gear train 122 to the various accessories 64-72. In this example, the first portion 124 includes about seven apertures 128; however, the first portion 124 may include any desired number of apertures 128. The plurality of apertures 128 are defined about the first portion 124 so as to extend about a perimeter of the first portion 124, such that the accessories 62-74 are arranged about a perimeter of the first portion 124. Generally, the accessories 62-74 are arranged substantially circumferentially about the first portion 124, which enables for a reduction in the volume of the engine nacelle N.

Figure 7:
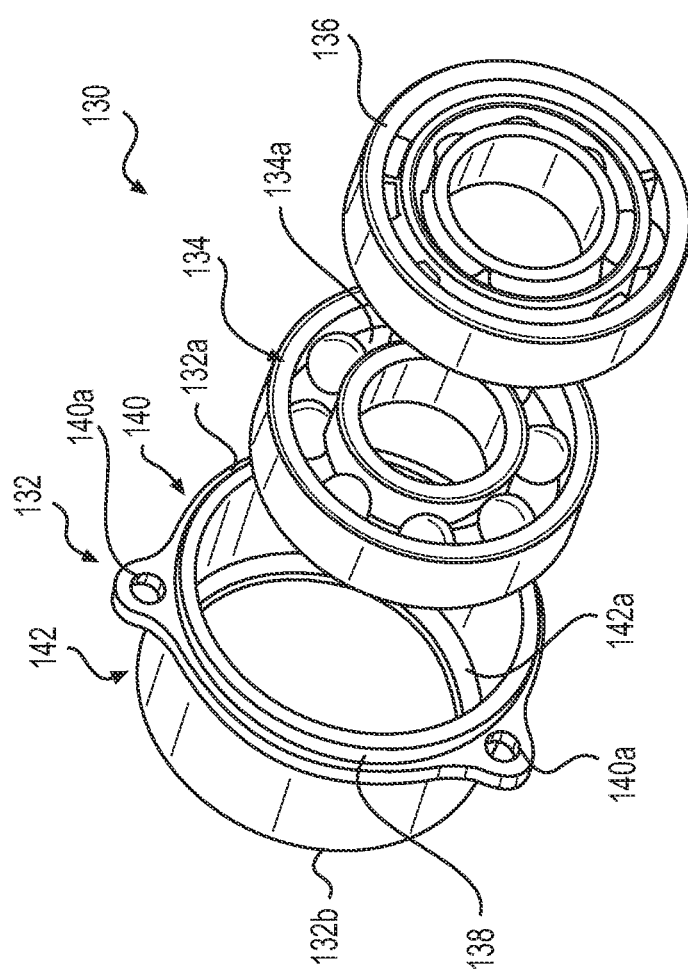
FIG. 7 is an exploded perspective view of the adaptor of FIG. 4.

One or more of the plurality of apertures 128 is sized and shaped to receive a bearing assembly 130. With reference to FIG. 7, the bearing assembly 130 includes a housing 132, a first bearing 134 and a second bearing 136. The housing 132 includes a lip 138, an annular flange 140 and a body 142. The housing 132 is circumferentially open and receives the first bearing 134 and the second bearing 136. The lip 138 is defined at a first end 132a of the housing 132, and has a reduced wall thickness compared to the body 142 to enable the lip 138 to be received through the respective aperture 128 of the first portion 124 of the gear case 120. The annular flange 140 extends circumferentially about the housing 132 and defines a plurality of coupling bores 140a. In this example, the annular flange 140 defines about three coupling bores 140a; however, the annular flange 140 may define any number of coupling bores 140a. The coupling bores 140a are generally spaced apart about a perimeter of the annular flange 140. The coupling bores 140a receive a suitable mechanical fastener, such as a bolt, screw, rivet, etc. to couple the bearing assembly 130 to the gear case 120. The body 142 is substantially cylindrical, and receives the first bearing 134 and the second bearing 136. The body 142 includes a retaining flange 142a, which is defined at a second end 132b of the housing 132. The retaining flange 142a has a diameter, which is less than a diameter of a reminder of the housing 132 to retain the first bearing 134 within the housing 132. One skilled in the art would appreciate that the body 142 may be designed and manufactured with any shape to properly interface with any particular accessory 62-74.

Figure 8:
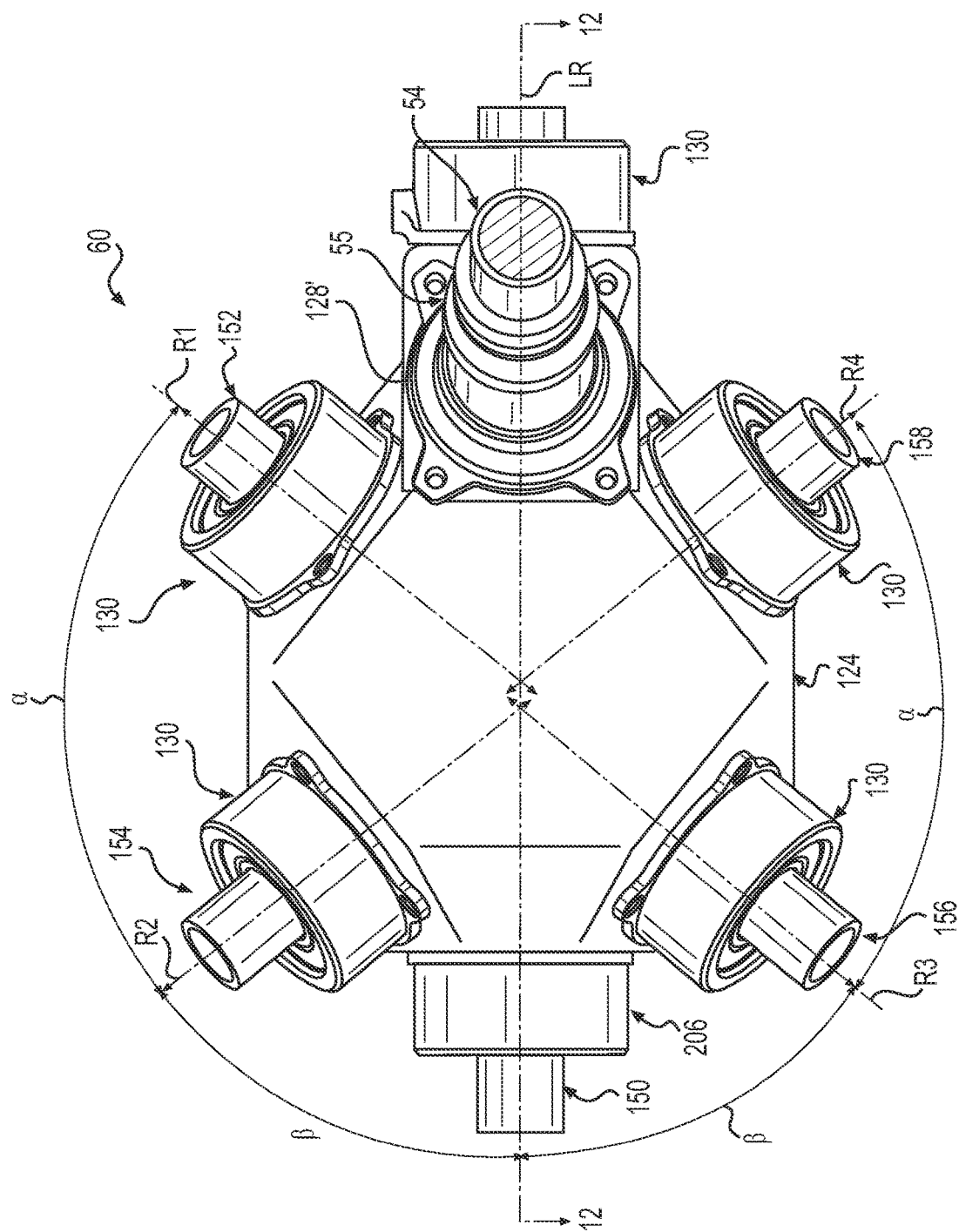
FIG. 8 is a top view of the compact accessory gearbox of FIG. 1.

The first bearing 134 and the second bearing 136 enable the rotation of a portion of the gear train 122 to transfer torque between the towershaft 54, sleeve 55 and the respective one of the accessories 62-74. The first bearing 134 and the second bearing 136 are generally ball bearings or a combination of roller and ball bearings that cooperate to receive a portion of the gear train 122 therethrough to enable the portion of the gear train 122 to rotate relative to the gear case 120. The first bearing 134 generally includes a seal 134a, which faces the retaining flange 142a of the housing 132 when the first bearing 134 is coupled to the housing 132. Generally, the second bearing 136 does not include a seal. By not including a seal with the second bearing 136, oil contained within the gear case 120 may lubricate both the first bearing 134 and the second bearing 136, while the seal 134a of the first bearing 134 prevents the leakage of oil outside of the compact accessory gearbox 60. With reference to FIG. 8, a top view of the compact accessory gearbox 60 illustrates that the bearing assemblies 130 are generally coupled to each of the apertures 128, with the exception of the aperture 128', which uses a different bearing configuration.

Figure 9:
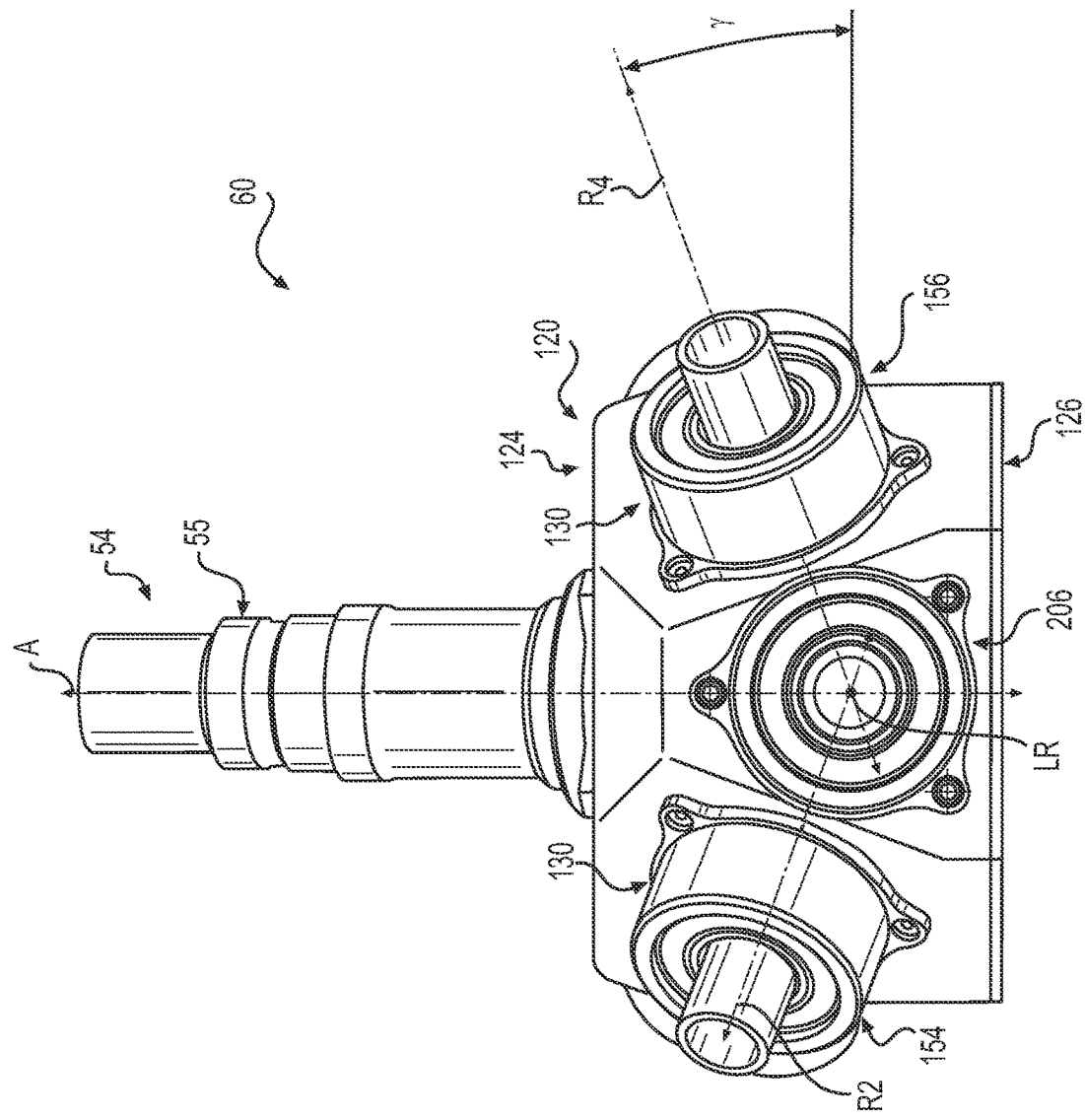
FIG. 9 is a back view of the compact accessory gearbox of FIG. 1.

With reference to FIG. 9, the second portion 126 is shown in greater detail. The second portion 126 may be generally planar and is removably coupled to the first portion 124. In one example, the first portion 124 is coupled to the second portion 126 via a plurality of fastening bores that receive mechanical fasteners, such as bolts, screws, etc. (not shown); however, the first portion 124 and the second portion 126 may be coupled together via any suitable technique.

With reference back to FIG. 3, the gear train 122 is coupled to the respective accessories 64-72. The gear train 122 includes the shaft 150, a first accessory drive shaft 152, a second accessory drive shaft 154, a third accessory drive shaft 156 and a fourth accessory drive shaft 158. As will be discussed in greater detail herein, the gear 58 of the towershaft 54 is coupled to or meshingly engages with the shaft 150, and the shaft 150 is coupled to or meshingly engages with the first accessory drive shaft 152, the second accessory drive shaft 154, the third accessory drive shaft 156 and the fourth accessory drive shaft 158. As shown in FIG. 3, the first accessory drive shaft 152 drives the lubrication pump 74, the second accessory drive shaft 154 drives the fuel control unit 72, the third accessory drive shaft 156 drives the hydraulic pump 68 and the fourth accessory drive shaft 158 drives the DC generator 66. The shaft 150 is driven by the starter turbine 64 during engine start-up, and drives the permanent magnet alternator 70. The starter turbine 64 is generally decoupled from the shaft 150 after the start-up of the gas turbine engine 10 by an overspeed clutch. The shaft 150 also defines the air-oil separator 76.

Figure 10:
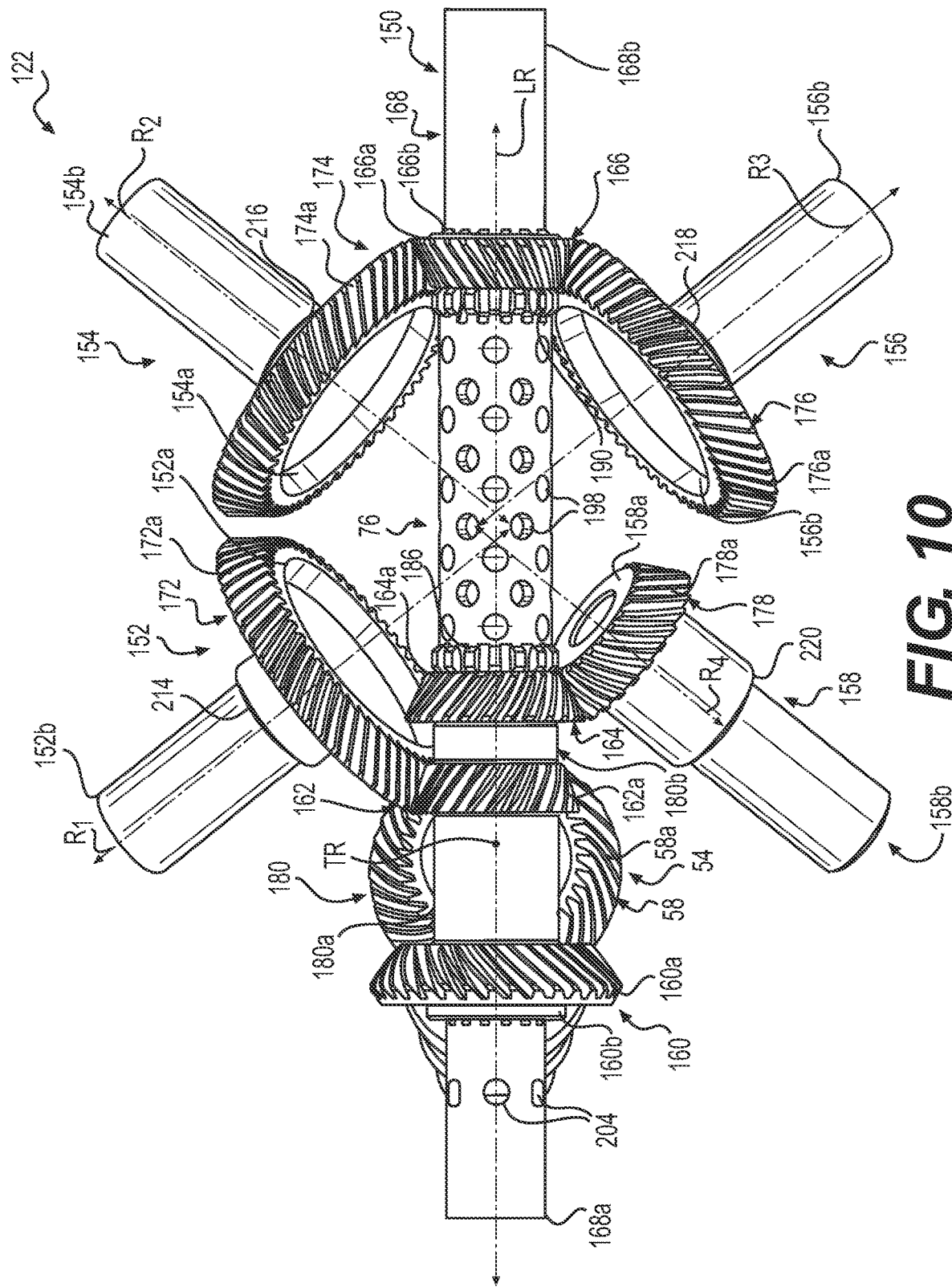
FIG. 10 is a bottom view of a gear train of the compact accessory gearbox of FIG. 1.

With reference to FIG. 10, the gear train 122 is shown without the gear case 120, the bearing assembly 130, the adaptors 80, the housing 59 and the accessories 62-74 for clarity. As shown, the shaft 150 has a shaft axis of rotation LR, which is substantially transverse to the axis of rotation TR of the towershaft 54. The axis of rotation LR of the shaft 150 is substantially parallel to the axis of rotation R of the gas turbine engine 10 (FIG. 1). In certain embodiments, however, the axis of rotation LR of the shaft 150 may not be substantially parallel to the axis of rotation R. The first accessory drive shaft 152 has a first accessory axis of rotation R1, which is substantially transverse to the axis of rotation LR of the shaft 150. The second accessory drive shaft 154 has a second accessory axis of rotation R2, which is substantially transverse or oblique to the axis of rotation LR of the shaft 150, and substantially transverse or oblique to the first accessory axis of rotation R1. The third accessory drive shaft 156 has a third accessory axis of rotation R3, which is substantially transverse or oblique to the axis of rotation LR of the shaft 150, and is substantially transverse to the first accessory axis of rotation R1. The third accessory axis of rotation R3 is also substantially transverse to the second accessory axis of rotation R2, and intersects the second accessory axis of rotation R2 along the axis of rotation LR of the shaft 150. The fourth accessory drive shaft 158 has a fourth accessory axis of rotation R4, which is substantially transverse or oblique to the axis of rotation LR of the shaft 150, and is substantially transverse to the third accessory axis of rotation R3. The fourth accessory axis of rotation R4 is substantially transverse to the first accessory axis of rotation R1, and intersects the first accessory axis of rotation R1 along the axis of rotation LR of the shaft 150. The fourth accessory axis of rotation R4 is substantially transverse to the second axis of rotation R2.

Figure 10A:
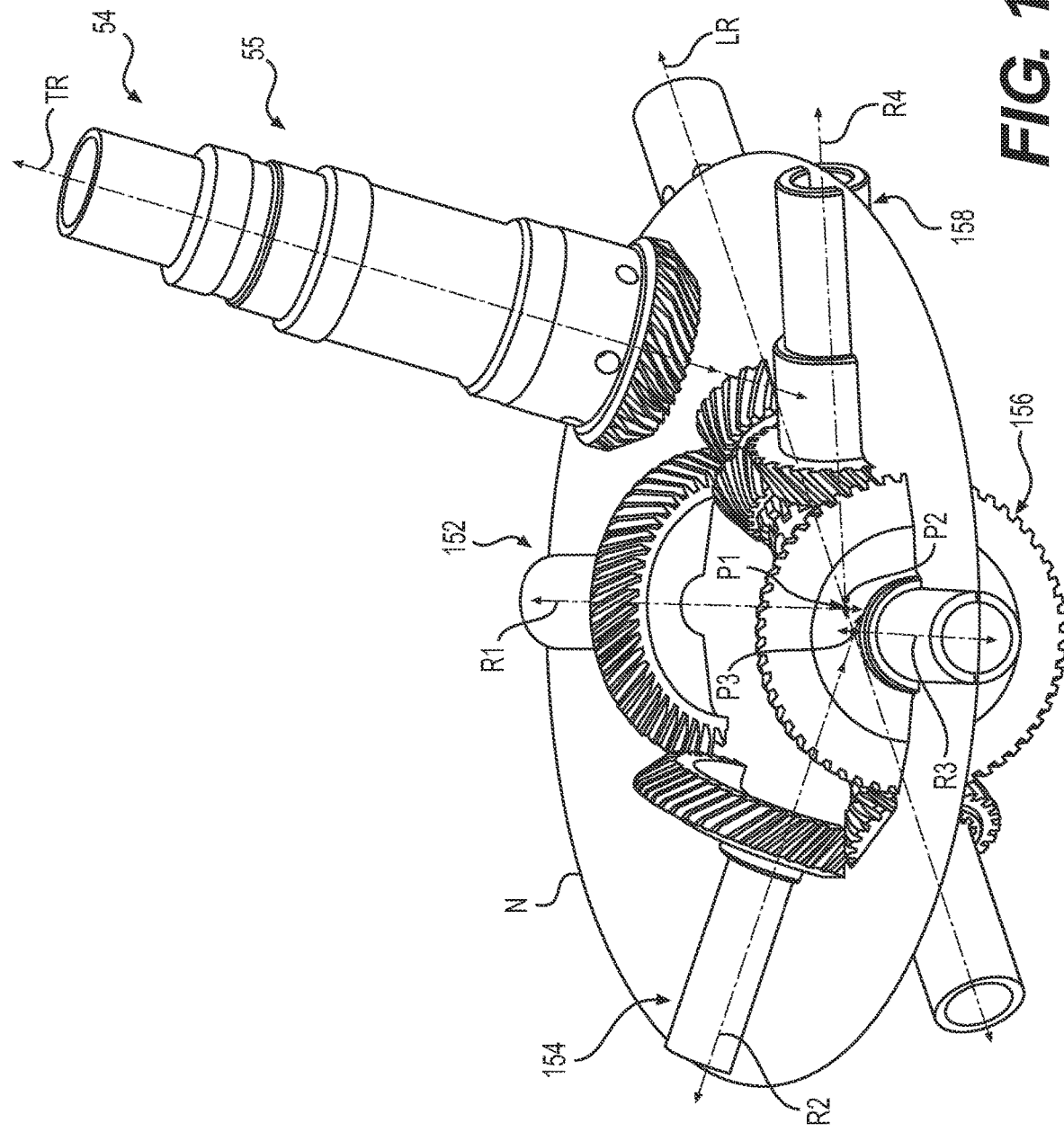
FIG. 10A is a schematic perspective illustration of the gear train of FIG. 10, which illustrates that a portion of the gear train is on an imaginary cone.
Figure 10B:
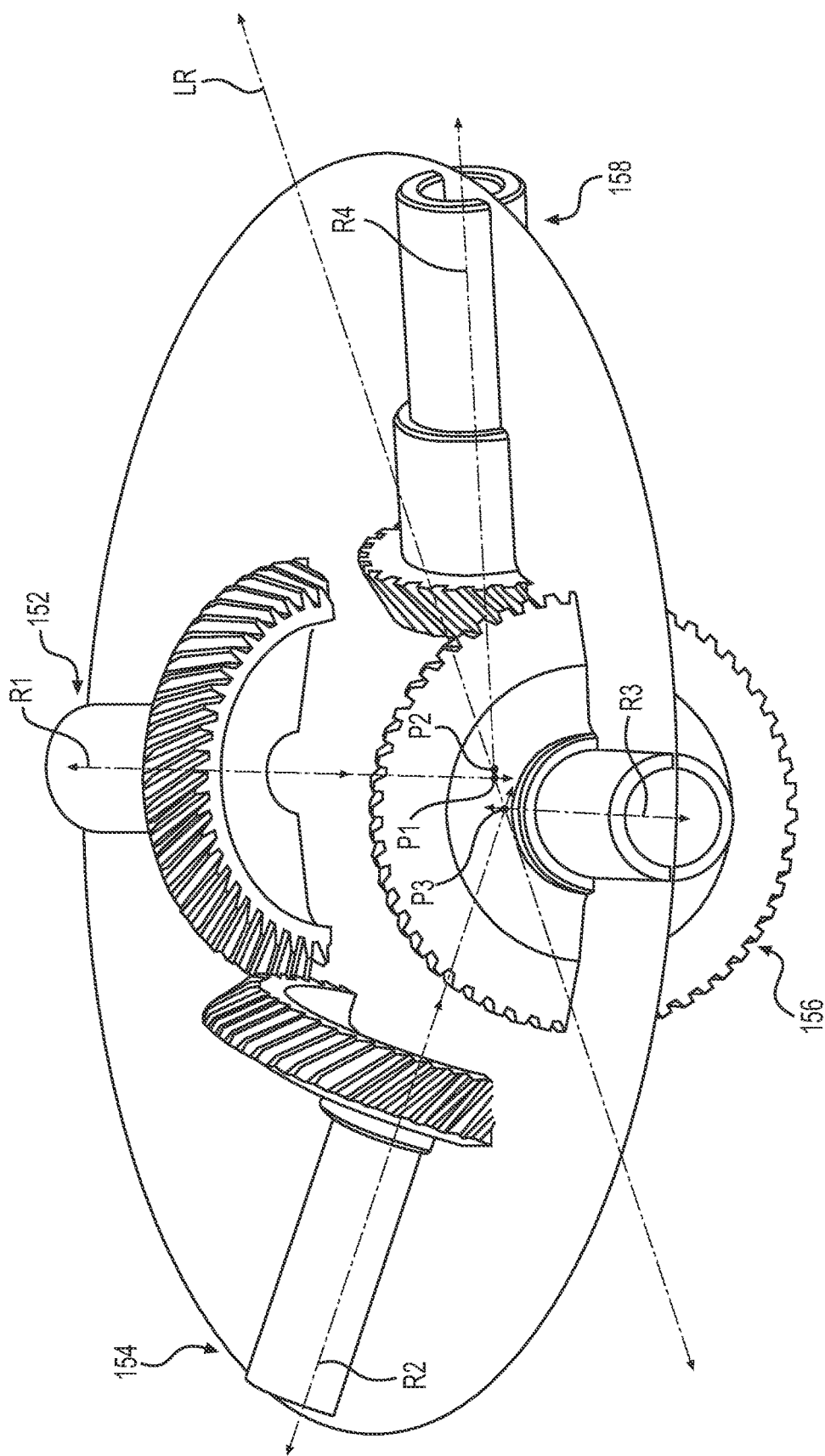
FIG. 10B is a schematic perspective illustration of the gear train of FIG. 10, which illustrates that a portion of the gear train is on an imaginary cone.

Each of the first accessory axis of rotation R1, the second accessory axis of rotation R2, the third accessory axis of rotation R3 and the fourth accessory axis of rotation R4 define the centerlines for the respective accessory drive shafts 152-158. The shaft axis of rotation LR defines the central axis for the shaft 150. With reference to FIGS. 10A and 10B, the first accessory axis of rotation R1, the accessory axis of rotation R2, the third accessory axis of rotation R3 and the fourth accessory axis of rotation R4 all substantially fit within an imaginary cone N. In this example, the cone N has an angle that ranges from about zero degrees (a flat disk) to about 20 degrees. In one example, the cone N has an angle of about 12.5 degrees. The shaft 150 and the shaft axis of rotation LR are generally not on this cone N, as shown. By defining the first accessory axis of rotation R1, the accessory axis of rotation R2, the third accessory axis of rotation R3 and the fourth accessory axis of rotation R4 on the cone N, the accessories 62-74 are mounted substantially circumferentially around the compact accessory gearbox 60. In this example, the first accessory axis of rotation R1 intersects the shaft axis of rotation LR at a first point P1, and the fourth accessory axis of rotation R4 intersects the shaft axis of rotation LR at a second point P2. Two of the accessory axes of rotation (i.e. the second accessory axis of rotation R2 and the third accessory axis of rotation R3) intersect the shaft axis of rotation LR at a third point P3. The point P1 is different than the point P2, and is spaced apart from the point P2 along the shaft axis of rotation LR. The point P3 is different than the points P1 and P2, and is spaced apart from the points P1 and P2 along the shaft axis of rotation LR.

As best shown in FIG. 8, the first accessory axis of rotation R1 is spaced apart along the perimeter of the gear case 120 from the second accessory axis of rotation R2 by an angle α. In one example, the angle α is about 67 degrees to about 87 degrees. Similarly, the third accessory axis of rotation R3 is spaced apart along the perimeter of the gear case 120 from the fourth accessory axis of rotation R4 by the angle α. The second accessory axis of rotation R2 is spaced apart from the shaft axis of rotation LR by an angle β. In one example, the angle β is about 41 degrees to about 61 degrees. Similarly, the third accessory axis of rotation R3 is spaced apart from the shaft axis of rotation LR by the angle β. Thus, the accessory drive shafts 152-158 are generally spaced apart about the gear case 120 in a substantially circular manner, which results in the placement of the accessories 62-74 substantially circumferentially about the gear case 120, allowing for a reduction in a space required in the engine nacelle N for the accessories 62-74.

With additional reference to FIG. 9, one or more of the accessory axes of rotation R1-R4 may be angled relative to the shaft axis of rotation LR. For example, each of the first accessory axis of rotation R1, the second accessory axis of rotation R2, the third accessory axis of rotation R3 and the fourth accessory axis of rotation R4 are angularly offset from the shaft axis of rotation LR by an angle γ. Stated another way, each of the first accessory axis of rotation R1, the second accessory axis of rotation R2, the third accessory axis of rotation R3 and the fourth accessory axis of rotation R4 are offset relative to an axis A of the compact accessory gearbox 60 by the angle γ. In one example, the angle γ is about 10 degrees to about 30 degrees. By angling each of the first accessory drive shaft 152, the second accessory drive shaft 154, the third accessory drive shaft 156 and the fourth accessory drive shaft 158 relative to the shaft 150, additional space saving may be achieved within the engine nacelle N by enabling the accessories 62-74 to better follow the curvature of the gas turbine engine 10.

With reference to FIG. 10, the shaft 150 is directly coupled to the towershaft 54, and comprises a high speed shaft. For example, the shaft 150 rotates at about 18,500 revolutions per minute (rpm). The shaft 150 includes a first shaft gear 160, a second shaft gear 162, a third shaft gear 164 and a fourth shaft gear 166 each arranged on and coupled to a body 168 of the shaft 150. In one example, the first shaft gear 160, second shaft gear 162, third shaft gear 164, fourth shaft gear 166 are coupled to the body 168 via a splined joint, however, the first shaft gear 160, second shaft gear 162, third shaft gear 164, fourth shaft gear 166 can be coupled to the body 168 via any technique, including, but not limited to, keyway, welding, machined as one piece, 3D printed, etc. The first shaft gear 160, second shaft gear 162, third shaft gear 164, fourth shaft gear 166 and the body 168 are generally formed of a metal or metal alloy, and may be cast, machined, forged, etc. In this example, the first shaft gear 160, second shaft gear 162, third shaft gear 164 and fourth shaft gear 166 each comprise bevel gears having a respective plurality of bevel gear teeth 160a, 162a, 164a, 166a. The plurality of bevel gear teeth 160a-166a are defined about a perimeter or circumference of each of the shaft gears 160-166. The plurality of bevel gear teeth 160a of the first shaft gear 160 are coupled to and meshingly engage with the plurality of bevel gear teeth 58a of the gear 58 of the towershaft 54 and the sleeve 55. The plurality of bevel gear teeth 162a of the second shaft gear 162 are coupled to and meshingly engage with a plurality of bevel gear teeth 172a of a first accessory gear 172 coupled to the first accessory drive shaft 152. The plurality of bevel gear teeth 164a of the third shaft gear 164 are coupled to and meshingly engage with a plurality of bevel gear teeth 178a of a fourth accessory gear 178 coupled to the fourth accessory drive shaft 158. The plurality of bevel gear teeth 166a of the fourth shaft gear 166 are coupled to and meshingly engage with a plurality of bevel gear teeth 174a of a second accessory gear 174 coupled to the second accessory drive shaft 154, and are coupled to and meshingly engage with a plurality of bevel gear teeth 176a of a third accessory gear 176 coupled to the third accessory drive shaft 156. In one example, the first shaft gear 160 also includes a projection 160b, which aids in coupling the shaft 150 to the gear case 120. Similarly, the fourth shaft gear 166 includes a projection 166b, which aids in coupling the shaft 150 to the gear case 120.

One or more of the shaft gears 160-166 may be separated by one or more spacers 180. In this example, the first shaft gear 160 and the second shaft gear 162 are separated by a spacer 180a, and the second shaft gear 162 and the third shaft gear 164 are separated by a spacer 180b. The spacer 180a may have a length along the shaft axis of rotation LR, which is greater than a length of the spacer 180b along the shaft axis of rotation LR. The spacers 180a, 180b may be composed of any suitable material, such as a metal or metal alloy, and may be stamped, cast, machined, etc. The spacers 180a, 180b provide clearance for the coupling of the gear 58, the first accessory gear 172 and the fourth accessory gear 178 for rotation with the shaft 150.

Figure 11:
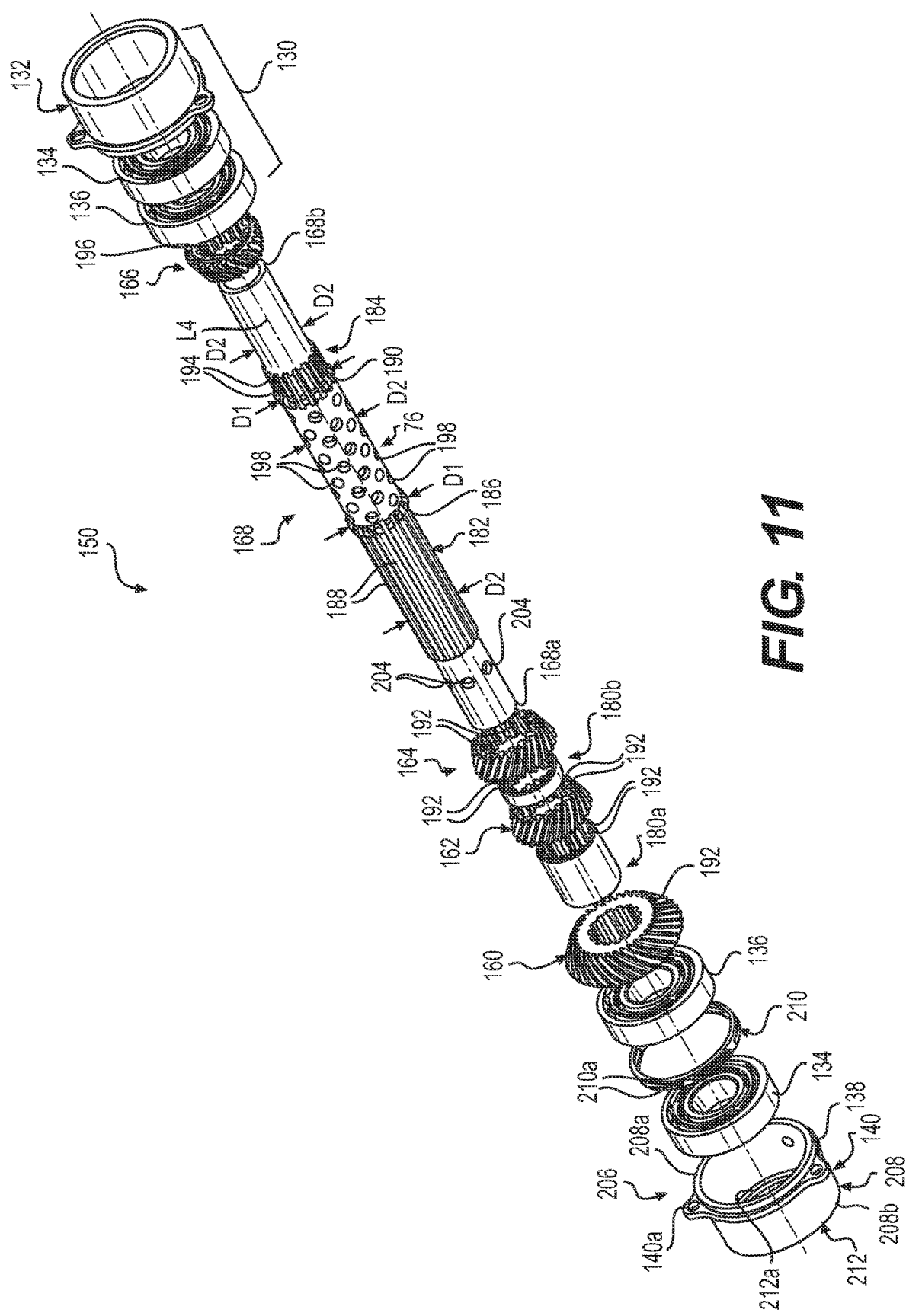
FIG. 11 is an exploded perspective view of a shaft for use with the gear train of FIG. 10 and the compact accessory gearbox of FIG. 1.

With reference to FIG. 11, the body 168 of the shaft 150 includes a first coupling portion 182, a second coupling portion 184 and the air-oil separator 76 defined between a first end 168a and a second end 168b of the body 168. The first end 168a of the body 168 is coupled to the starter turbine 64, and the second end 168b of the body 168 is coupled to the permanent magnet alternator 70. The body 168 of the shaft 150 is formed of a metal or metal alloy, and may be cast, machined, stamped, forged, etc. In one example, the first coupling portion 182 extends for a first distance along a longitudinal axis L4 of the shaft 150, which is different than a second distance that the second coupling portion 184 extends along the longitudinal axis L4. In this example, the first distance is greater than the second distance. The first coupling portion 182 includes a first enlarged portion 186 and a first plurality of splines 188. The first enlarged portion 186 is defined adjacent to the air-oil separator 76, and may be defined by material removal along a remainder of the body 168. In this regard, the first enlarged portion 186 generally has a larger diameter than a remainder of the body 168, with the exception of a second enlarged portion 190 associated with the second coupling portion 184. The first enlarged portion 186 and the second enlarged portion 190 each have substantially the same diameter D1, which is different than a diameter D2 of the remainder of the body 168. In this example, the diameter D1 is greater than the diameter D2. The first enlarged portion 186 and the second enlarged portion 190 provide stops that prevent the further advancement of the third shaft gear 164 and the fourth shaft gear 166 respectively, along the body 168 during assembly of the third shaft gear 164 and the fourth shaft gear 166 to the body 168. Thus, each of the third shaft gear 164 and the fourth shaft gear 166 have an inner diameter, which is less than the diameter D1.

The first plurality of splines 188 are defined slightly past the first enlarged portion 186 so as to extend slightly beyond the first enlarged portion 186 (i.e. the first plurality of splines 188 extend past the first enlarged portion 186 so as to abut the air-oil separator 76) and through the first enlarged portion 186 towards the first end 168a of the body 168. Generally, the first plurality of splines 188 extend for a length along the longitudinal axis L4 that enables the first shaft gear 160, spacer 180a, second shaft gear 162, spacer 180b and third shaft gear 164 to be coupled to the body 168. In this regard, each of the first shaft gear 160, spacer 180a, second shaft gear 162, spacer 180b and third shaft gear 164 include a plurality of mating splines 192. Each of the plurality of mating splines 192 cooperate with the first plurality of splines 188 to couple the first shaft gear 160, spacer 180a, second shaft gear 162, spacer 180b and third shaft gear 164 to the body 168, while inhibiting relative rotation between the body 168 and the first shaft gear 160, spacer 180a, second shaft gear 162, spacer 180b and third shaft gear 164. Stated another way, the plurality of mating splines 192 and the first plurality of splines 188 couple the first shaft gear 160, spacer 180a, second shaft gear 162, spacer 180b and third shaft gear 164 to the body 168 such that the first shaft gear 160, spacer 180a, second shaft gear 162, spacer 180b and third shaft gear 164 rotate with the body 168.

The plurality of splines 188 comprise any number of splines defined about a circumference of the shaft 150, and may comprise a single spline, if desired. Generally, the plurality of splines 188 are defined by machining or cutting the plurality of splines 188 into the body 168, however, the plurality of splines 188 may be formed through any desired technique. The plurality of mating splines 192 may be defined along an inner diameter of each of the first shaft gear 160, spacer 180a, second shaft gear 162, spacer 180b and third shaft gear 164 during the formation of the first shaft gear 160, spacer 180a, second shaft gear 162, spacer 180b and third shaft gear 164. It will be understood, however, that the spacer 180a and/or the spacer 180b need not include the plurality of mating splines 192, and can comprise a generally smooth or uniform inner diameter. Generally, the plurality of mating splines 192 extend along an entirety of the inner diameter of each of the first shaft gear 160, spacer 180a, second shaft gear 162, spacer 180b and third shaft gear 164 to facilitate the advancement of each of the first shaft gear 160, spacer 180a, second shaft gear 162, spacer 180b and third shaft gear 164 along the first coupling portion 182. It should be noted that while the first shaft gear 160, spacer 180a, second shaft gear 162, spacer 180b and third shaft gear 164 are each described herein as including the plurality of mating splines 192, the first shaft gear 160, spacer 180a, second shaft gear 162, spacer 180b and third shaft gear 164 may include any number of mating splines 192 that cooperate to couple the first shaft gear 160, spacer 180a, second shaft gear 162, spacer 180b and third shaft gear 164 to the body 168. Moreover, the plurality of mating splines 192 may be formed to have an interference fit with the first plurality of splines 188, if desired.

The second coupling portion 184 includes the second enlarged portion 190 and a second plurality of splines 194. The second enlarged portion 190 is defined adjacent to the air-oil separator 76, and is defined so to be substantially opposite the first enlarged portion 186. The second enlarged portion 190 may be defined by material removal along a remainder of the body 168. The second plurality of splines 194 are defined slightly past the second enlarged portion 190 so as to extend slightly beyond the second enlarged portion 190 (i.e. the second plurality of splines 194 extend past the second enlarged portion 190 so as to abut the air-oil separator 76) and through the second enlarged portion 190 towards the second end 168b of the body 168. Generally, the second plurality of splines 194 extend for a length along the longitudinal axis L4 that enables the fourth shaft gear 166 to be coupled to the body 168. In this regard, generally, the fourth shaft gear 166 includes a second plurality of mating splines 196. Each of the second plurality of mating splines 196 cooperate with the second plurality of splines 194 to couple the fourth shaft gear 166 to the body 168, while inhibiting relative rotation between the body 168 and the fourth shaft gear 166. Stated another way, the second plurality of mating splines 196 and the second plurality of splines 194 couple the fourth shaft gear 166 to the body 168 such that the fourth shaft gear 166 rotates with the body 168.

The second plurality of splines 194 comprise any number of splines defined about a circumference of the shaft 150, and may comprise a single spline, if desired. Generally, the second plurality of splines 194 are defined by machining or cutting the second plurality of splines 194 into the body 168, however, the second plurality of splines 194 may be formed through any desired technique. The second plurality of mating splines 196 may be defined along an inner diameter the fourth shaft gear 166 during the formation of the fourth shaft gear 166. Generally, the second plurality of mating splines 196 extend along an entirety of the inner diameter of the fourth shaft gear 166 to facilitate the advancement of the fourth shaft gear 166 along the second coupling portion 184. It should be noted that while the fourth shaft gear 166 is described herein as including the second plurality of mating splines 196, the fourth shaft gear 166 may include any number of mating splines 196 that cooperate to couple the fourth shaft gear 166 to the body 168. Moreover, the second plurality of mating splines 196 may be formed to have an interference fit with the second plurality of splines 194, if desired.

Figure 12:
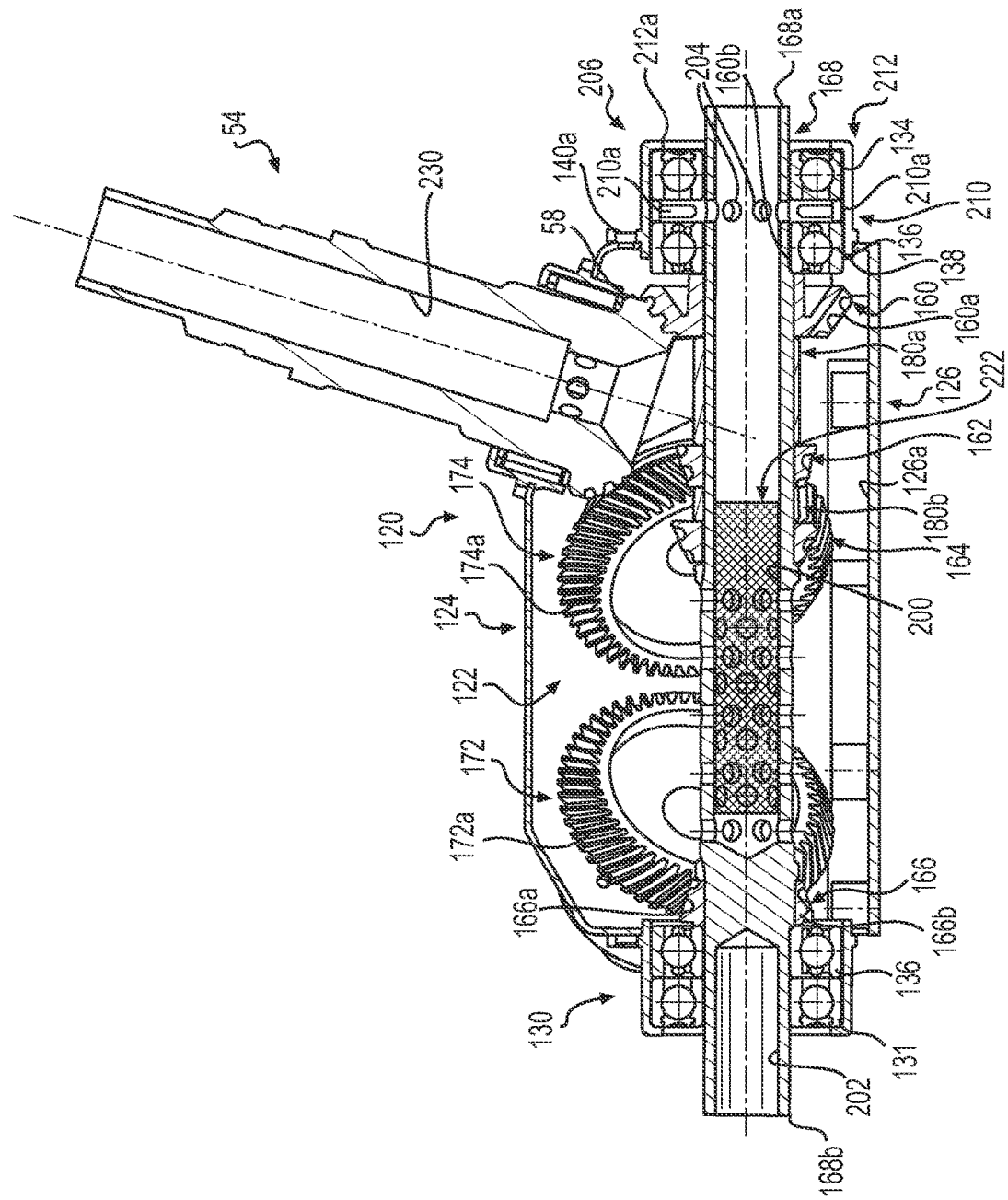
FIG. 12 is a cross-sectional view of the compact accessory gearbox of FIG. 8, taken along line 12-12 of FIG. 8.

The air-oil separator 76 is defined through the body 168 between the first coupling portion 182 and the second coupling portion 184. In this example, the air-oil separator 76 comprises a plurality of bores 198 defined through the body 168 such that each of the plurality of bores 198 are in communication with an inner channel 200 defined in the body 168, as shown in FIG. 12. In this regard, the body 168 comprises a substantially hollow shaft from the second enlarged portion 190 to the first end 168a of the body 168. Stated another way, the body 168 is milled or bored to define the inner channel 200, which extends through the body 168 from the first end 168a to the second enlarged portion 190.

The inner channel 200 enables the separation of the air from the oil within the gear case 120 as the shaft 150 rotates within the gear case 120. Generally, the plurality of bores 198 centrifugates oil from the air, with the air separated from the oil remaining within the inner channel 200 to be drawn from the gear case 120 via a plurality of bores 204 defined near the first end 168a of the shaft 150. An additional mesh or screen 222 may be packed inside of the inner channel 200 to increase an available surface area within the inner channel 200, which improves the air oil separation effectiveness. The plurality of bores 198 are generally defined about an entirety of the circumference of the body 168 to define the air-oil separator 76, and may be arranged in a repeating pattern, or may be uniquely defined as desired along the circumference. A sump pump (not shown) may be coupled to the gear case 120 to remove the separated oil that generally collects along a surface 126a of the second portion 126 of the gear case 120. In certain examples, the body 168 may also define a second counterbore or inner channel 202 defined from the second end 168b to the second coupling portion 184 to reduce a weight of the shaft 150. The second counterbore or inner channel 202 may be defined into the body 168 via milling or boring at the second end 168b to the second coupling portion 184.

With reference back to FIG. 11, the body 168 also includes the plurality of bores 204 defined near the first end 168a. The air separated by the air-oil separator 76 flows from the plurality of bores 198 through the inner channel 200 to the plurality of bores 204. The air exits the shaft 150, and thus, the gear case 120 via the plurality of bores 204. The plurality of bores 204 are in communication with the inner channel 200 and a shaft bearing assembly 206 to bleed air collected by the air-oil separator 76 out of the gear case 120. In this regard, with additional reference to FIG. 12, the shaft 150 may be assembled within the gear case 120 with one of the bearing assemblies 130 coupled about or near the second end 168b to couple the shaft 150 within the gear case 120 for rotation, while the first end 168a may be coupled to the gear case 120 via the shaft bearing assembly 206 for rotation. In one example, the bearing assembly 130 bears against the projection 166b of the fourth shaft gear 166 when the bearing assembly 130 is coupled to the gear case 120 and the shaft 150 to maintain the assembly of the shaft 150 within the gear case 120. The bearing assembly 206 bears against the projection 160b of the first shaft gear 160 when the bearing assembly 206 is coupled to the gear case 120 to maintain the assembly of the shaft 150 within the gear case 120.

As the shaft bearing assembly 206 may be substantially similar to the bearing assembly 130 described with regard to FIG. 7, the same reference numerals will be used to denote the same or similar components. In one example, the shaft bearing assembly 206 includes a housing 208, the first bearing 134, the second bearing 136 and a spacer 210. The housing 208 includes the lip 138, the annular flange 140 and a body 212. The housing 208 is circumferentially open and receives the first bearing 134 and the second bearing 136. The lip 138 is defined at a first end 208a of the housing 208, and the annular flange 140 extends circumferentially about the housing 208 and defines the plurality of coupling bores 140a. The body 212 is substantially cylindrical, and receives the first bearing 134 and the second bearing 136. The body 212 includes a retaining flange 212a, which is defined at a second end 208b of the housing 208. The retaining flange 212a has a diameter, which is less than a diameter of a reminder of the housing 208 to retain the first bearing 134 within the housing 208.

The spacer 210 is positioned between the first bearing 134 and the second bearing 136 within the housing 208. The spacer 210 includes a plurality of slots 210a defined about a circumference of the spacer 210, which are in fluid communication with the plurality of bores 204 of the body 168, as shown in FIG. 12. The plurality of slots 210a enable the air collected via the air-oil separator 76 to be bleed out of the compact accessory gearbox 60, as the spacer 210 is located external to the gear case 120 when the bearing assembly 206 is coupled to the gear case 120.

With reference back to FIG. 10, the first accessory drive shaft 152, the second accessory drive shaft 154, the third accessory drive shaft 156 and the fourth accessory drive shaft 158 are each coupled directly to the shaft 150 to be driven directly by the shaft 150. Each of the first accessory drive shaft 152, the second accessory drive shaft 154, the third accessory drive shaft 156 and the fourth accessory drive shaft 158 are composed of a suitable metal or metal alloy, and may be cast, machined, forged, etc. The first accessory drive shaft 152 includes the first accessory gear 172 defined about a first end 152a of the first accessory drive shaft 152. The first accessory gear 172 is composed of a suitable metal or metal alloy, and may be cast, machined, forged, etc. and coupled to the first accessory drive shaft 152. Further, the first accessory gear 172 may be integrally formed with the first accessory drive shaft 152. The first accessory gear 172 comprises a bevel gear that has the plurality of bevel gear teeth 172a. The plurality of bevel gear teeth 172a are defined about a perimeter or circumference of the first accessory gear 172, and the plurality of bevel gear teeth 172a meshingly engage the plurality of bevel gear teeth 162a of the second shaft gear 162. The first accessory drive shaft 152 comprises a lower speed drive shaft, and is driven to rotate at about 8,500 rpm. Stated another way, the first accessory drive shaft 152 rotates at a speed, which is different than a rotational speed of the shaft 150 and is generally less than the rotational speed of the shaft 150. The first accessory drive shaft 152 is coupled to the lubrication pump 74 at a second end 152b. The first accessory drive shaft 152 also includes a bearing stop portion 214. The bearing stop portion 214 is defined as an area along the first accessory drive shaft 152 that has an increased or greater diameter than a reminder of the first accessory drive shaft 152 to provide a stop for the bearing assembly 130. The bearing stop portion 214 is defined near the first end 152a, and when assembled into the gear case 120, the bearing stop portion 214 contacts the second bearing 136 of the bearing assembly 130.

The second accessory drive shaft 154 includes the second accessory gear 174 defined about a first end 154a of the second accessory drive shaft 154. The second accessory gear 174 is composed of a suitable metal or metal alloy, and may be cast, machined, forged, etc. and coupled to the second accessory drive shaft 154. Further, the second accessory gear 174 may be integrally formed with the second accessory drive shaft 154. The second accessory gear 174 comprises a bevel gear that has the plurality of bevel gear teeth 174a. The plurality of bevel gear teeth 174a are defined about a perimeter or circumference of the second accessory gear 174, and the plurality of bevel gear teeth 174a meshingly engage the plurality of bevel gear teeth 166a of the fourth shaft gear 166. The second accessory drive shaft 154 comprises a lower speed drive shaft, and is driven to rotate at about 8,500 rpm. Stated another way, the second accessory drive shaft 154 rotates at a speed, which is different than the rotational speed of the shaft 150 and is generally less than the rotational speed of the shaft 150. The second accessory drive shaft 154 is coupled to the fuel control unit 72 at a second end 154b. The second accessory drive shaft 154 also includes a second bearing stop portion 216. The second bearing stop portion 216 is defined as an area along the second accessory drive shaft 154 that has an increased or greater diameter than a reminder of the second accessory drive shaft 154 to provide a stop for the bearing assembly 130. The second bearing stop portion 216 is defined near the first end 154a, and when assembled into the gear case 120, the second bearing stop portion 216 contacts the second bearing 136 of the bearing assembly 130.

The third accessory drive shaft 156 includes the third accessory gear 176 defined about a first end 156a of the third accessory drive shaft 156. The third accessory gear 176 is composed of a suitable metal or metal alloy, and may be cast, machined, forged, etc. and coupled to the third accessory drive shaft 156. Further, the third accessory gear 176 may be integrally formed with the third accessory drive shaft 156. The third accessory gear 176 comprises a bevel gear that has the plurality of bevel gear teeth 176a. The plurality of bevel gear teeth 176a are defined about a perimeter or circumference of the third accessory gear 176, and the plurality of bevel gear teeth 176a meshingly engage the plurality of bevel gear teeth 166a of the fourth shaft gear 166. The third accessory drive shaft 156 comprises a lower speed drive shaft, and is driven to rotate at about 8,500 rpm. Stated another way, the third accessory drive shaft 156 rotates at a speed, which is different than the rotational speed of the shaft 150 and is generally less than the rotational speed of the shaft 150. The third accessory drive shaft 156 is coupled to the hydraulic pump 68 at a second end 156b. The third accessory drive shaft 156 also includes a third bearing stop portion 218. The third bearing stop portion 218 is defined as an area along the third accessory drive shaft 156 that has an increased or greater diameter than a reminder of the third accessory drive shaft 156 to provide a stop for the bearing assembly 130. The third bearing stop portion 218 is defined near the first end 156a, and when assembled into the gear case 120, the third bearing stop portion 218 contacts the second bearing 136 of the bearing assembly 130.

The fourth accessory drive shaft 158 includes the fourth accessory gear 178 defined about a first end 158a of the fourth accessory drive shaft 158. The fourth accessory gear 178 is composed of a suitable metal or metal alloy, and may be cast, machined, forged, etc. and coupled to the fourth accessory drive shaft 158. Further, the fourth accessory gear 178 may be integrally formed with the fourth accessory drive shaft 158. The fourth accessory gear 178 comprises a bevel gear that has the plurality of bevel gear teeth 178a. The plurality of bevel gear teeth 178a are defined about a perimeter or circumference of the fourth accessory gear 178, and the plurality of bevel gear teeth 178a meshingly engages the plurality of bevel gear teeth 164a of the third shaft gear 164. The fourth accessory drive shaft 158 comprises a high speed drive shaft, and is driven to rotate at about 18,500 rpm. Stated another way, the fourth accessory drive shaft 158 rotates at a speed, which is about the same as the rotational speed of the shaft 150. Thus, generally, the fourth accessory gear 178 has a diameter that is different or greater than a diameter of the first accessory gear 172, second accessory gear 174 and third accessory gear 176. The fourth accessory drive shaft 158 is coupled to the DC generator 66 at a second end 158b. The fourth accessory drive shaft 158 also includes a fourth bearing stop portion 220. The fourth bearing stop portion 220 is defined as an area along the fourth accessory drive shaft 158 that has an increased or greater diameter than a remainder of the fourth accessory drive shaft 158 to provide a stop for the bearing assembly 130. The fourth accessory drive shaft 158 is defined near the first end 158a, and when assembled into the gear case 120, the fourth accessory drive shaft 158 contacts the second bearing 136 of the bearing assembly 130.

Figure 1B:
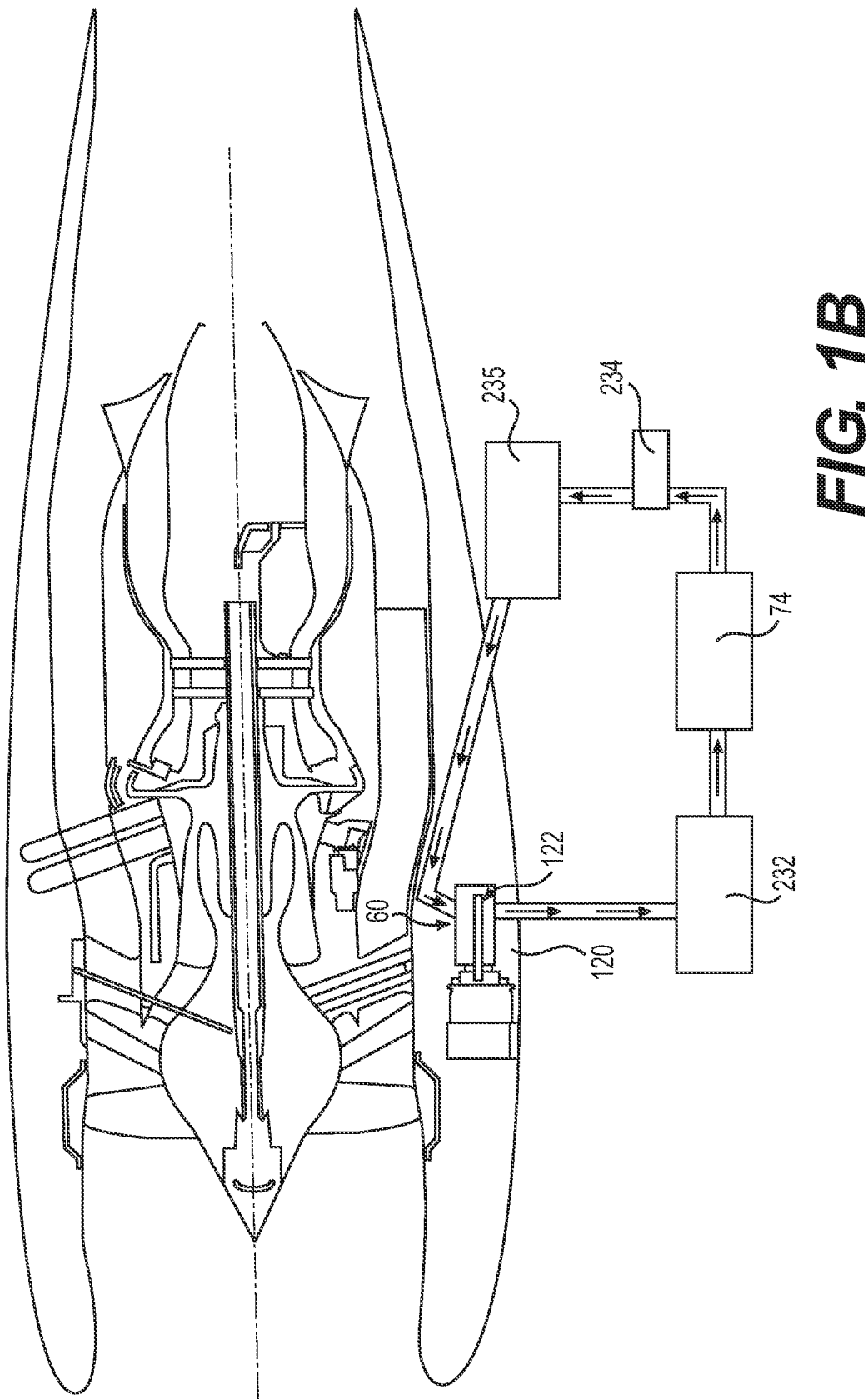
FIG. 1B is a schematic cross-sectional illustration of a gas turbine engine, which includes an exemplary compact accessory system including an exemplary compact accessory gearbox in accordance with the various teachings of the present disclosure.
Figure 13:
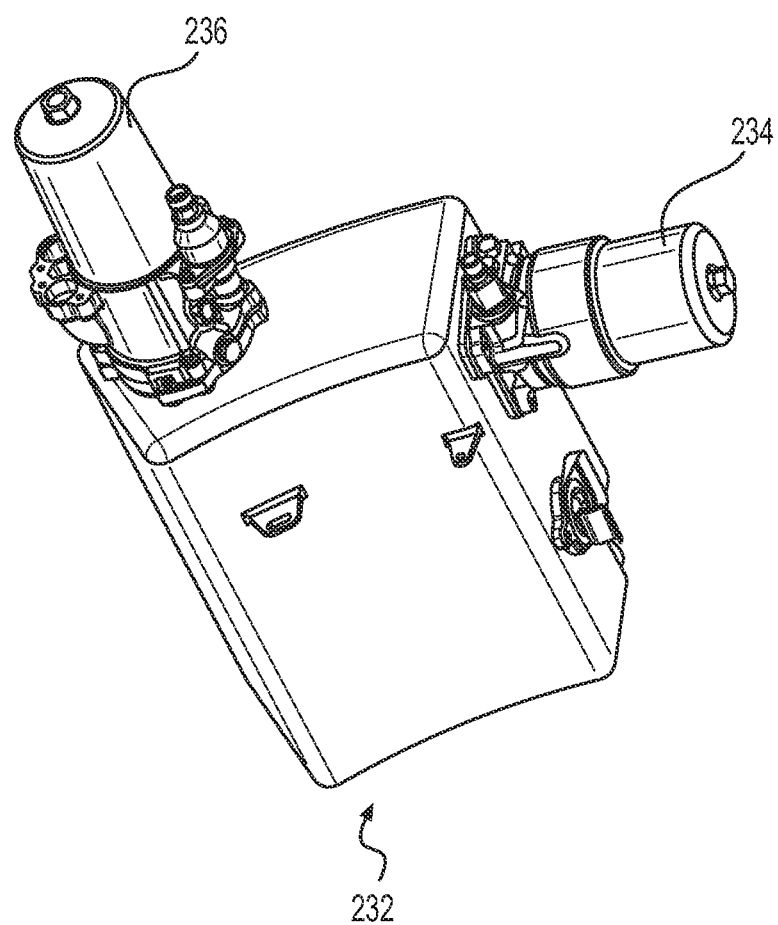
FIG. 13 is a perspective view of an exemplary oil tank for use with the compact accessory gearbox of FIG. 1.

Generally, the gear case 120 is not filled with oil to lubricate the gear train 122. In this example, with reference to FIGS. 1B and 13, oil or lubricating fluid for the compact accessory gearbox 60 is also received from an oil tank 232. The oil tank 232 is disposed near the compact accessory gearbox 60 within the engine nacelle N. One or more conduits are coupled between the oil tank 232 and the compact accessory gearbox 60 to enable oil from the oil tank 232 to flow to the gear case 120 to lubricate the gear train 122. In FIG. 1B, the oil is contained in the oil tank 232, and flows to the oil pump 74, through an oil filter 234, and through an air/oil cooler 235 that delivers the oil or lubricating fluid to the gear case 120 of the compact accessory gearbox 60 to lubricate the gear train 122. The oil is scavenged from the compact accessory gearbox 60 and returns to the oil tank 232. Thus, the oil tank 232 and the compact accessory gearbox 60 may include one or more fittings, hoses, control valves and ports, which fluidly couple the conduits to the oil tank 232 and the compact accessory gearbox 60. In this example, the oil tank 232 is separate from the compact accessory gearbox 60. With reference to FIG. 13, the oil tank 232 may include the oil filter 234, a fuel heater/oil cooler 236 and some accessories, including, plugs, fittings, hoses and ports (not shown).

In order to assemble the shaft 150, in one example, with the body 168 of the shaft 150 machined to include the first coupling portion 182, the second coupling portion 184 and the air-oil separator 76, the third shaft gear 164 is slid over the first end 168a of the body 168 until the third shaft gear 164 abuts the first enlarged portion 186. The fourth shaft gear 166 is slid over the second end 168b of the body 168 until the fourth shaft gear 166 abuts the second enlarged portion 190. The spacer 180b is slid over the first end 168a until the spacer 180b abuts the third shaft gear 164. The second shaft gear 162 is slid over the first end 168a until the second shaft gear 162 abuts the spacer 180b. The spacer 180a is slid over the first end 168a until the spacer 180a abuts the second shaft gear 162. The first shaft gear 160 is slid over the first end 168a until the first shaft gear 160 abuts the spacer 180a.

In one example, in order to assemble the compact accessory gearbox 60, the first accessory drive shaft 152, the second accessory drive shaft 154, the third accessory drive shaft 156 and the fourth accessory drive shaft 158 are each positioned through a respective one of the plurality of apertures 128 defined through the first portion 124 of the gear case 120. Respective ones of the bearing assemblies 130 are coupled to each of the first accessory drive shaft 152, the second accessory drive shaft 154, the third accessory drive shaft 156 and the fourth accessory drive shaft 158, and are slid over the respective second ends 152b, 154b, 156b, 158b until the bearing assembly 130 contacts the respective bearing stop portion 214, 216, 218, 220. Upon contacting the bearing stop portions 214, 216, 218, 220, a plurality of mechanical fasteners are inserted through the coupling bores 140a to couple the bearing assemblies 130 to the first portion 124, thereby coupling the first accessory drive shaft 152, the second accessory drive shaft 154, the third accessory drive shaft 156 and the fourth accessory drive shaft 158 to the first portion 124 of the gear case 120.

With the shaft 150 assembled, the shaft 150 is inserted through the aperture 128" until the fourth shaft gear 166 contacts a surface of the first portion 124. The bearing assembly 130 is slid over the second end 168*b* of the body 168 and the bearing assembly 206 is slid over the first end 168*a* of the body 168 such that the plurality of bores 204 are aligned with the plurality of slots 210*a* in the spacer 210 to enable air to vent from the gear case 120. A plurality of mechanical fasteners are inserted into the coupling bores 140*a* to couple the bearing assembly 130 and the bearing assembly 206 to the first portion 124 of the gear case 120. The second portion 126 is positioned over the first portion 124 and coupled to the first portion 124 via one or more mechanical fasteners.

With the first portion 124 and the second portion 126 of the gear case 120 coupled together, the gear case 120 is positioned such that the second end 54*b* of the towershaft 54 is received within the aperture 128' and the gear 58 of the sleeve 55 meshingly engages with the shaft 150. The housing 59 of the towershaft 54 is coupled to the first portion 124 of the gear case 120 via one or more mechanical fasteners, and the struts 106*a*, 106*b* are coupled to the gas turbine engine 10 to couple the compact accessory gearbox 60 to the gas turbine engine 10.

With the compact accessory gearbox 60 coupled to the gas turbine engine 10, the accessories 62-74 are coupled to the first accessory drive shaft 152, the second accessory drive shaft 154, the third accessory drive shaft 156, the fourth accessory drive shaft 158 and the shaft 150 via the adaptors 80. The compact accessory gearbox 60 has a volume that is about $\frac{1}{18}^{th}$ the size of a conventional gearbox, and provides about a 93 percent reduction in space required within the engine nacelle N for the compact accessory gearbox 60 when compared to a conventional gearbox.

In one example, with the high pressure driveshaft 46 driving or rotating the towershaft 54 about the towershaft axis of rotation TR, the torque from the high pressure driveshaft 46 is transmitted through the towershaft 54 and into the gear train 122 via the meshing engagement of the gear 58 with the first shaft gear 160. Thus, the rotation of the towershaft 54 rotates the shaft 150 about the shaft axis of rotation LR. The rotation of the shaft 150 drives or rotates the first accessory drive shaft 152 (via the engagement between the second shaft gear 162 and the first accessory gear 172); drives or rotates the second accessory drive shaft 154 (via the engagement between the fourth shaft gear 166 and the second accessory gear 174); drives or rotates the third accessory drive shaft 156 (via the engagement between the fourth shaft gear 166 and the third accessory gear 176); and drives or rotates the fourth accessory drive shaft 158 (via the engagement between the third shaft gear 164 and the fourth accessory gear 178). The rotation of the shaft 150 also separates the air from the oil within the compact accessory gearbox 60, which is bled out through the plurality of bores 204 and slots 210*a*. The rotation of the drive shafts 152-158 provides input torque the respective accessories 74, 72, 68 and 66 for operating the respective accessories 74, 72, 68 and 66. Moreover, the rotation of the shaft 150 provides input torque to the permanent magnet alternator 70.

Prior to a start-up of the gas turbine engine 10, the starter valve 62 may direct pressurized air to the starter turbine 64. The starter turbine 64 rotates the shaft 150, and the engagement between the first shaft gear 160 and the gear 58 transmits the torque from the starter turbine 64 to the high pressure driveshaft 46, which causes the high pressure driveshaft 46 to rotate. The rotation of the high pressure driveshaft 46 drives the compressor 32 and the high pressure turbine 38, thereby enabling a start-up of the gas turbine engine 10.

It should be noted that the compact accessory gearbox 60 may be configured in various different ways. For example, with reference to FIG. 14, a simplified view of a compact accessory gearbox 300 is shown in which the bearing assemblies 130, 206, adaptors 80 and accessories 62-74 are removed for clarity. As the compact accessory gearbox 300 is similar to the compact accessory gearbox 60 discussed with regard to FIGS. 1-13, only the differences between the compact accessory gearbox 300 and the compact accessory gearbox 60 will be discussed in detail herein, with the same reference numerals used to denote the same or substantially similar components. The compact accessory gearbox 300 can be employed with the gas turbine engine 10 to transmit torque from the towershaft 54 to the accessories 64-74.

The compact accessory gearbox 300 includes the gear case 120 and a gear train 302. The gear train 302 is coupled to the respective accessories 64-74. Similar to the compact accessory gearbox 60, the accessories 62-74 are arranged substantially circumferentially about the first portion 124 of the compact accessory gearbox 300, which enables for a reduction in the volume of the engine nacelle N. The gear train 302 includes a shaft 304, a first accessory drive shaft 306, a second accessory drive shaft 314, a third accessory drive shaft 308, a fourth accessory drive shaft 310 and a fifth accessory drive shaft 312. As will be discussed in greater detail herein, the gear 58 of the sleeve 55 is coupled to or meshingly engages with the shaft 304, and the shaft 304 is coupled to or meshingly engages with the first accessory drive shaft 306 and the second accessory drive shaft 314. Generally, the first accessory drive shaft 306 drives the lubrication pump 74, the third accessory drive shaft 308 drives the fuel control unit 72, the fourth accessory drive shaft 310 drives the drives the permanent magnet alternator 70, the fifth accessory drive shaft 312 drives the hydraulic pump 68 and the second accessory drive shaft 314 drives the DC generator 66. The shaft 304 is driven by the starter turbine 64.

Figure 14:
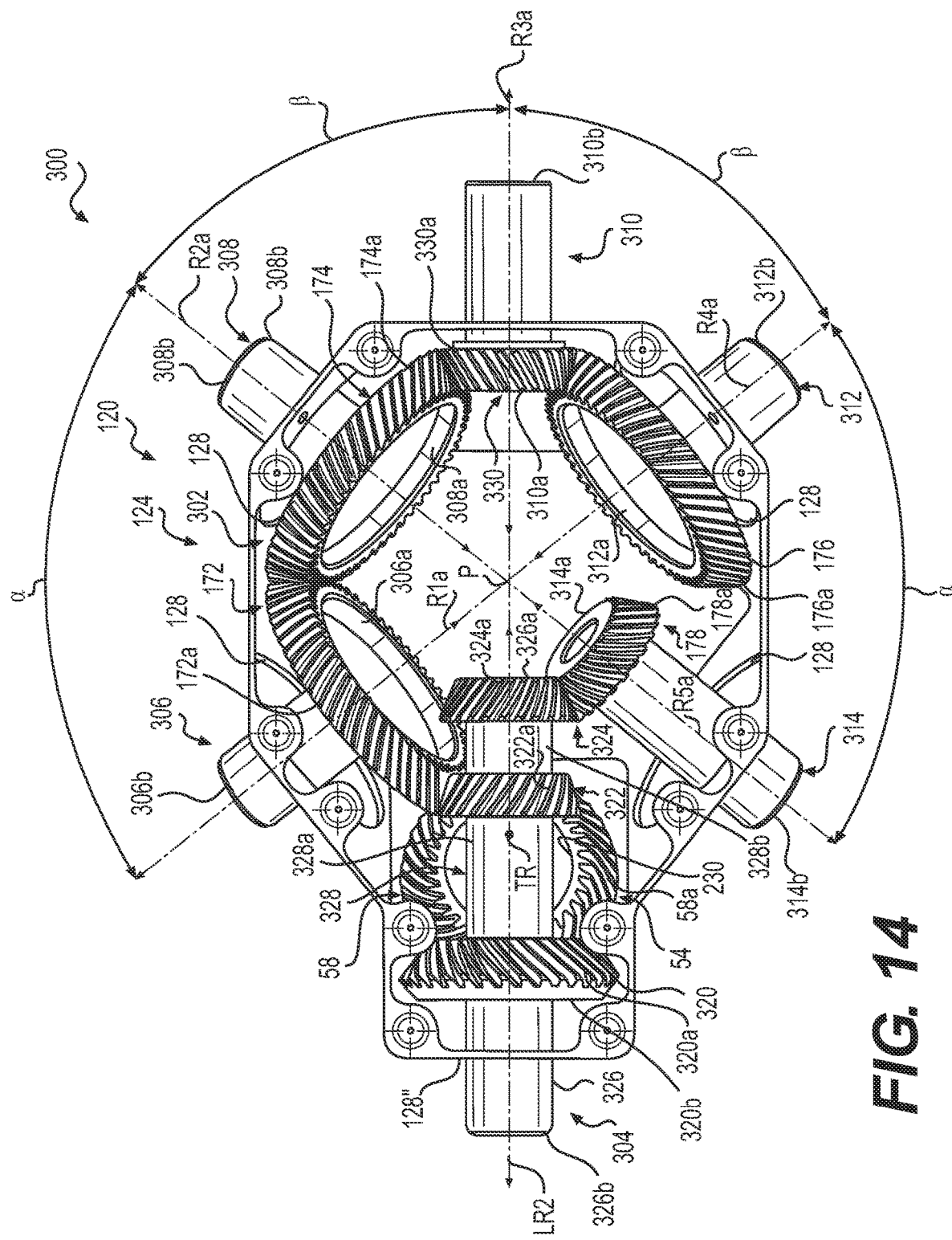
FIG. 14 is a schematic bottom view of a compact accessory gearbox for use with the compact accessory system of FIG. 1 according to the various teachings of the present disclosure.

With continued reference to FIG. 14, the shaft 304 has a shaft axis of rotation LR2, which is substantially transverse to the axis of rotation TR of the towershaft 54. The axis of rotation LR of the shaft 304 is substantially parallel to the axis of rotation R of the gas turbine engine 10 (FIG. 1). In certain embodiments, however, the axis of rotation LR of the shaft 304 may not be substantially parallel to the axis of rotation R. The first accessory drive shaft 306 has a first accessory axis of rotation R1*a*, which is substantially transverse to the axis of rotation LR2 of the shaft 304. The third accessory drive shaft 308 has a third accessory axis of rotation R2*a*, which is substantially transverse to the axis of rotation LR2 of the shaft 304, and substantially transverse to the first accessory axis of rotation R1*a*. The fourth accessory drive shaft 310 has a fourth accessory axis of rotation R3*a*, which is substantially parallel to the axis of rotation LR2 of the shaft 304, and is substantially transverse to the first accessory axis of rotation R1*a*. The fourth accessory axis of rotation R3*a* is also substantially transverse to the third accessory axis of rotation R2*a*. The fifth accessory drive shaft 312 has a fifth accessory axis of rotation R4*a*, which is substantially transverse to the axis of rotation LR2 of the shaft 304, and is substantially transverse to the fourth accessory axis of rotation R3*a*. The fifth accessory axis of rotation R4*a* is substantially transverse to the first accessory axis of rotation R1*a*. The fifth accessory axis of rotation R4*a* is substantially transverse to the third axis of rotation R2*a*. The second accessory drive shaft 314 has a second accessory axis of rotation R5*a*, which is substantially transverse to the axis of rotation LR2 of the shaft 304, and is substantially transverse to the fourth accessory axis of rotation R3a. The second accessory axis of rotation R5a is substantially transverse to the third accessory axis of rotation R2a, and is substantially transverse to the first accessory axis of rotation R1a. The second accessory axis of rotation R5a is substantially transverse to the fifth axis of rotation R4a. In this example, each of the axes of rotation LR2, R1a-R5a, which each comprise centerlines, intersect at a single common point P. The axes of rotation TR and R5a also intersect each other, but may not necessarily intersect each other at point P.

Each of the first accessory axis of rotation R1a, the third accessory axis of rotation R2a, the fourth accessory axis of rotation R3a, the fifth accessory axis of rotation R4a and the second accessory axis of rotation R5a define the centerlines for the respective accessory drive shafts 306-314. The shaft axis of rotation LR2 defines the central axis for the shaft 304.

In this example, the first accessory axis of rotation R1a is spaced apart along the perimeter of the gear case 120 from the third accessory axis of rotation R2a by the angle α. In one example, the angle α is about 67 degrees to about 87 degrees. Similarly, the second accessory axis of rotation R5a is spaced apart along the perimeter of the gear case 120 from the fifth accessory axis of rotation R4a by the angle α. The third accessory axis of rotation R2a is spaced apart from the fourth accessory axis of rotation R3a by the angle β. Similarly, the fourth accessory axis of rotation R3a is spaced apart from the fifth axis of rotation R4a by the angle β. Thus, the accessory drive shafts 306-314 are generally spaced apart about the gear case 120 in a substantially circular manner, which results in the placement of the accessories 62-74 substantially circumferentially about the gear case 120, allowing for a reduction in a space required in the engine nacelle N for the accessories 62-74. In addition, one or more of the accessory axes of rotation R1a-R5a may be angled relative to the shaft axis of rotation LR2, if desired.

The shaft 304 is directly coupled to the sleeve 55, and comprises a high speed shaft. For example, the shaft 304 rotates at about 18,500 revolutions per minute (rpm). The shaft 304 includes a first shaft gear 320, a second shaft gear 322 and a third shaft gear 324 each arranged on and coupled to a body 326 of the shaft 304. The first shaft gear 320, second shaft gear 322, third shaft gear 324 and the body 326 are generally formed of a metal or metal alloy, and may be cast, machined, forged, etc. In this example, the first shaft gear 320, second shaft gear 322 and third shaft gear 324 each comprise bevel gears having a respective plurality of bevel gear teeth 320a-324a. The plurality of bevel gear teeth 320a-324a are each defined about a perimeter or circumference of each of the shaft gears 320-324. The plurality of bevel gear teeth 320a of the first shaft gear 320 are coupled to and meshingly engage with the plurality of bevel gear teeth 58a of the gear 58 of the sleeve 55. The plurality of bevel gear teeth 322a of the second shaft gear 322 are coupled to and meshingly engage with a plurality of bevel gear teeth 172a of the first accessory gear 172 coupled to the first accessory drive shaft 306. The plurality of bevel gear teeth 324a of the third shaft gear 324 are coupled to and meshingly engage with a plurality of bevel gear teeth 178a of the fourth accessory gear 178, which is coupled to the second accessory drive shaft 314. In one example, the first shaft gear 320 also includes a flat surface 320b, which aids in coupling the shaft 304 to the gear case 120 by providing a coupling surface for a respective one of the bearing assemblies 130, for example.

One or more of the shaft gears 320-324 may be separated by one or more spacers 328. In this example, the first shaft gear 320 and the second shaft gear 322 are separated by a spacer 328a, and the second shaft gear 322 and the third shaft gear 324 are separated by a spacer 328b. The spacer 328a may have a length along the shaft axis of rotation LR2, which is greater than a length of the spacer 328b along the shaft axis of rotation LR2. The spacers 328a, 328b may be composed of any suitable material, such as a metal or metal alloy, and may be stamped, cast, machined, etc. The spacers 328a, 328b provided clearance for the coupling of the gear 58, the first accessory gear 172 and the fourth accessory gear 178 for rotation with the shaft 150.

The body 326 of the shaft 304 is formed of a metal or metal alloy, and may be cast, machined, stamped, forged, etc. Although not illustrated herein, the body 326 may include the first coupling portion 182 and the second coupling portion 184, if desired. The body 326 includes a first end 326a opposite a second end 326b. The third shaft gear 324 is coupled at the first end 326a and the starter turbine 64 is coupled to the second end 326b.

The first accessory drive shaft 306 and the second accessory drive shaft 314 are each coupled directly to the shaft 304 to be driven directly by the shaft 304. Each of the first accessory drive shaft 306, the third accessory drive shaft 308, the fourth accessory drive shaft 310, the fifth accessory drive shaft 312 and the second accessory drive shaft 314 are composed of a suitable metal or metal alloy, and may be cast, machined, forged, etc. The first accessory drive shaft 306 includes the first accessory gear 172 defined about a first end 306a of the first accessory drive shaft 306, which meshingly engages the second shaft gear 322. The first accessory drive shaft 306 comprises a lower speed drive shaft, and is driven to rotate at about 8,500 rpm. Stated another way, the first accessory drive shaft 306 rotates at a speed, which is different than a rotational speed of the shaft 304 and is generally less than the rotational speed of the shaft 304. The first accessory drive shaft 306 is coupled to the lubrication pump 74 at a second end 306b.

The third accessory drive shaft 308 includes the second accessory gear 174 defined about a first end 308a of the third accessory drive shaft 308. The second accessory gear 174 is coupled to and meshingly engages the first accessory gear 172. The third accessory drive shaft 308 comprises a lower speed drive shaft, and is driven to rotate at about 8,500 rpm. Stated another way, the third accessory drive shaft 308 rotates at a speed, which is different than the rotational speed of the shaft 304 and is generally less than the rotational speed of the shaft 304. The third accessory drive shaft 308 is coupled to the fuel control unit 72 at a second end 308b.

The fourth accessory drive shaft 310 includes a fifth accessory gear 330 defined about a first end 310a of the fourth accessory drive shaft 310. The fifth accessory gear 330 is composed of a suitable metal or metal alloy, and may be cast, machined, forged, etc. and coupled to the fourth accessory drive shaft 310. Further, the fifth accessory gear 330 may be integrally formed with the fourth accessory drive shaft 310. The fifth accessory gear 330 comprises a bevel gear that has a plurality of bevel gear teeth 330a. The plurality of bevel gear teeth 330a are defined about a perimeter or circumference of the fifth accessory gear 330. The plurality of bevel gear teeth 330a are coupled to and meshingly engage the plurality of bevel gear teeth 174a of the second accessory gear 174, and the plurality of bevel gear teeth 330a are coupled to and meshingly engage the plurality of bevel gear teeth 176a of the third accessory gear 176. The fourth accessory drive shaft 310 comprises a high speed drive shaft, and is driven to rotate at about 18,500 rpm. Stated another way, the fourth accessory drive shaft 310 rotates at a speed, which is about the same as the rotational speed of the shaft 304. Thus, the fifth accessory gear 330 has a diameter, which is different or less than a diameter of the first accessory gear 172, the second accessory gear 174 and the third accessory gear 176. The fourth accessory drive shaft 310 is coupled to the permanent magnet alternator 70 at a second end 310b.

The fifth accessory drive shaft 312 includes the third accessory gear 176 defined about a first end 312a of the fifth accessory drive shaft 312. The plurality of bevel gear teeth 176a are coupled to and meshingly engage the plurality of bevel gear teeth 330a of the fifth accessory gear 330. The fifth accessory drive shaft 312 comprises a lower speed drive shaft, and is driven to rotate at about 8,500 rpm. Stated another way, the fifth accessory drive shaft 312 rotates at a speed, which is different than the rotational speed of the shaft 304 and is generally less than the rotational speed of the shaft 304. The fifth accessory drive shaft 312 is coupled to the hydraulic pump 68 at a second end 312b.

The second accessory drive shaft 314 includes the fourth accessory gear 178 defined about a first end 314a of the second accessory drive shaft 314. The plurality of bevel gear teeth 178a of the fourth accessory gear 178 are coupled to and meshingly engage the plurality of bevel gear teeth 324a of the third shaft gear 324. The second accessory drive shaft 314 comprises a high speed drive shaft, and is driven to rotate at about 18,500 rpm. Stated another way, the second accessory drive shaft 314 rotates at a speed, which is about the same as the rotational speed of the shaft 304. A diameter of the fourth accessory gear 178 is generally about equal to the diameter of the second accessory gear 330; however, it will be understood that the fourth accessory gear 178 can have a diameter that is different than the diameter of the fifth accessory gear 330. The second accessory drive shaft 314 is coupled to the DC generator 66 at a second end 314b. Generally, the second shaft gear 322 and the fifth accessory gear 330 are substantially identical, and the first accessory gear 172, the second accessory gear 174, the third accessory gear 176 are substantially identical Similar to the compact accessory gearbox 60 described with regard to FIGS. 1-13, the gear case 120 is not filled with oil to lubricate the gear train 302. Rather, oil to lubricate the gear train 302 is provided through the lubrication channel 230 defined through the sleeve 55. In certain examples, oil or lubricating fluid for the compact accessory gearbox 60 is also received from an oil tank (not shown).

In order to assemble the shaft 304, in one example, the third shaft gear 324 is slid over the body 326 to the first end 326a. The spacer 328b is slid over the body 326 until the spacer 328b abuts the third shaft gear 324. The second shaft gear 322 is slid over the body 326 until the second shaft gear 322 abuts the spacer 328b. The spacer 328a is slid over the body 326 until the spacer 328a abuts the second shaft gear 322. The first shaft gear 320 is slid over the body 326 until the first shaft gear 320 abuts the spacer 328a.

In one example, in order to assemble the compact accessory gearbox 300, the first accessory drive shaft 306, the third accessory drive shaft 308, the fourth accessory drive shaft 310, the fifth accessory drive shaft 312 and the second accessory drive shaft 314 are each positioned through a respective one of the plurality of apertures 128 defined through the first portion 124 of the gear case 120. Respective ones of the bearing assemblies 130 are coupled to each of the first accessory drive shaft 306, the third accessory drive shaft 308, the fourth accessory drive shaft 310, the fifth accessory drive shaft 312 and the second accessory drive shaft 314, and a plurality of mechanical fasteners are inserted through the coupling bores 140a to couple the bearing assemblies 130 to the first portion 124, thereby coupling the first accessory drive shaft 306, the third accessory drive shaft 308, the fourth accessory drive shaft 310, the fifth accessory drive shaft 312 and the second accessory drive shaft 314 to the first portion 124 of the gear case 120.

With the shaft 304 assembled, the shaft 304 is inserted through the aperture 128" until the third shaft gear 324 meshingly engages with the fourth accessory gear 178. The bearing assembly 130 is slid over the second end 326b of the body 326 and a plurality of mechanical fasteners are inserted into the coupling bores 140a to couple the bearing assembly 130 to the first portion 124 of the gear case 120. The second portion 126 is positioned over the first portion 124 and coupled to the first portion 124 via one or more mechanical fasteners. With the first portion 124 and the second portion 126 of the gear case 120 coupled together, the gear case 120 is coupled to the gas turbine engine 10 as discussed with regard to the compact accessory gearbox 60 of FIGS. 1-13. The compact accessory gearbox 300 has a volume that is about $\frac{1}{18}^{th}$ the size of a conventional gearbox, and provides about a 93 percent reduction in space required within the engine nacelle N for the compact accessory gearbox 300 when compared to a conventional gearbox.

In one example, with the high pressure driveshaft 46 driving or rotating the towershaft 54, the torque from the high pressure driveshaft 46 is transmitted through the towershaft 54, the sleeve 55 and into the gear train 302 via the meshing engagement of the gear 58 with the first shaft gear 320. Thus, the rotation of the towershaft 54 rotates the shaft 304 about the shaft axis of rotation LR2. The rotation of the shaft 304 drives or rotates the first accessory drive shaft 306 (via the engagement between the second shaft gear 322 and the first accessory gear 172); and drives or rotates the second accessory drive shaft 314 (via the engagement between the third shaft gear 324 and the fourth accessory gear 178). The rotation of the first accessory gear 172 drives or rotates the second accessory gear 174, and thus, the third accessory drive shaft 308. The rotation of the second accessory gear 174 drives or rotates the fifth accessory gear 330, and thus, the fourth accessory drive shaft 310. The rotation of the fifth accessory gear 330 drives or rotates the third accessory gear 176, and thus, the fifth accessory drive shaft 312. The rotation of the drive shafts 306-314 provides input torque through the respective accessories 74, 72, 70, 68 and 66 for operating the respective accessories 74, 72, 70, 68 and 66.

Prior to a start-up of the gas turbine engine 10, the starter valve 62 may direct pressurized air to the starter turbine 64. The starter turbine 64 rotates the shaft 304, and the engagement between the first shaft gear 320 and the gear 58 transmits the torque from the starter turbine 64 to the high pressure driveshaft 46, which causes the high pressure driveshaft 46 to rotate. The rotation of the high pressure driveshaft 46 drives the compressor 32 and the high pressure turbine 38, thereby enabling a start-up of the gas turbine engine 10.

Figure 15:
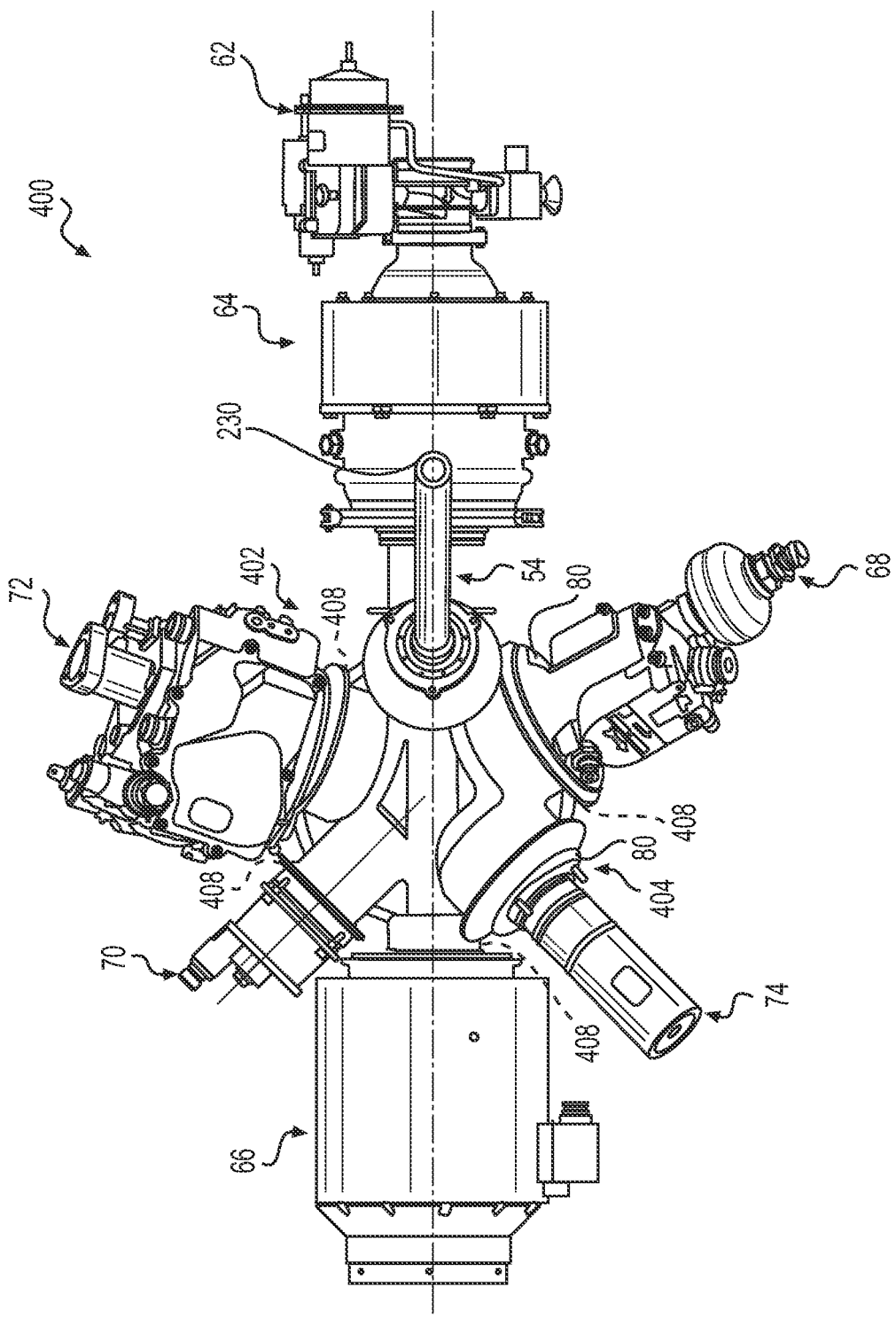
FIG. 15 is a top view of a compact accessory system for use with the gas turbine engine of FIG. 1, which includes a compact accessory gearbox in accordance with the various teachings of the present disclosure.

With reference to FIG. 15, a compact accessory system 400 is shown. As the compact accessory system 400 is similar to the compact accessory system 12 discussed with regard to FIGS. 1-13, only the differences between the compact accessory system 400 and the compact accessory system 12 will be discussed in detail herein, with the same reference numerals used to denote the same or substantially similar components. The compact accessory system 12 can be employed with the gas turbine engine 10 to transmit torque from the towershaft 54 to the accessories 64-74.

In this example, the compact accessory system 400 includes a compact accessory gearbox 402, which drives various accessories, including, but not limited to, the starter valve 62, the starter turbine 64, the direct-current (DC) generator 66, the hydraulic pump 68, the permanent magnet alternator 70, the fuel control unit 72 and the lubrication pump 74. Generally, the compact accessory gearbox 402 is coupled to the towershaft 54 via the gear 58 to receive the torque from the sleeve 55 and drive the accessories 62-74. It should be noted that the accessories 62-74 described herein are merely exemplary, as the compact accessory gearbox 60 may be used to drive any suitable accessory associated with the gas turbine engine 10. One or more of the accessories 64-74 can be coupled to the compact accessory gearbox 402 via the adaptor 80.

Figure 16:
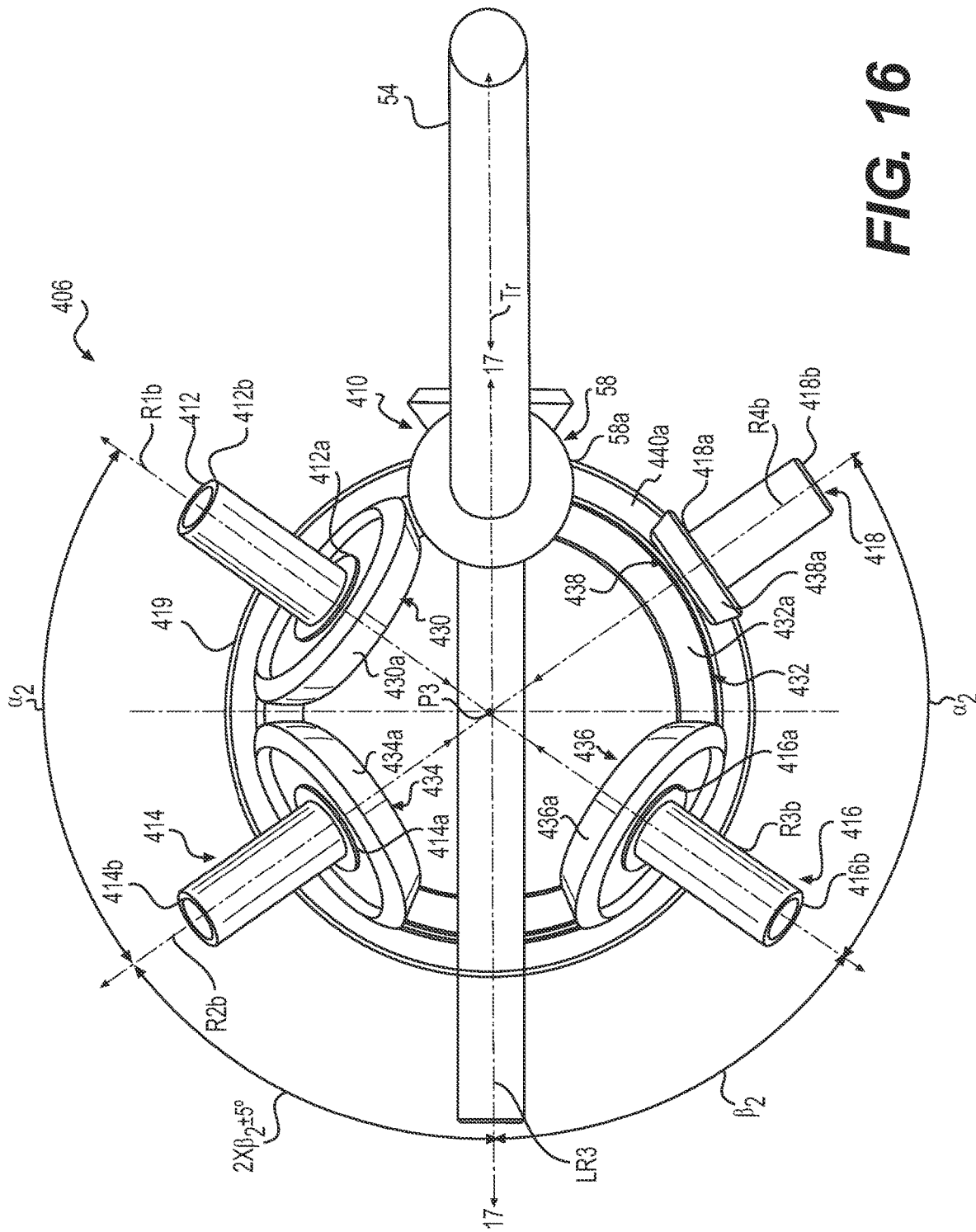
FIG. 16 is a top view of a gear train for use with the compact accessory gearbox of FIG. 15.

The compact accessory gearbox 402 includes a housing or gear case 404 and a gear train 406 (FIG. 16). In this example, the gear case 404 comprises a two-piece housing; however, the gear case 404 may comprise a one-piece housing, if desired. The gear case 404 is composed of a metal or metal alloy, which is stamped, machined or forged, etc. to define the shape of the gear case 404. Generally, the gear case 120 comprises a plurality of apertures 408 to couple the gear train 406 to the various accessories 64-74. The plurality of apertures 128 are defined about the gear case 404 so as to extend about a perimeter of the gear case 404, such that the accessories 62-74 are arranged about a perimeter of the gear case 404. Generally, the accessories 62-74 are arranged substantially circumferentially about the gear case 404, which enables for a reduction in the volume of the engine nacelle N. In certain instances, one or more bearing assemblies, such as the bearing assemblies 130, may be coupled between the accessories 62-74 and the gear case 404 to provided support for the rotation of the various portions of the gear train 406 relative to the gear case 404.

With reference to FIG. 16, the gear train 406 is shown without the gear case 404 and the accessories 62-74 for clarity. The gear train 406 includes a shaft 410, a first accessory drive shaft 412, a second accessory drive shaft 414, a third accessory drive shaft 416, a fourth accessory drive shaft 418 and a gear set 419. As shown in FIG. 15, the first accessory drive shaft 412 drives the fuel control unit 72, the second accessory drive shaft 414 drives the permanent magnet alternator 70, the third accessory drive shaft 416 drives the lubrication pump 74 and the fourth accessory drive shaft 418 drives the hydraulic pump 68. The shaft 410 is driven by the starter turbine 64, and drives the DC generator 66.

Figure 17:
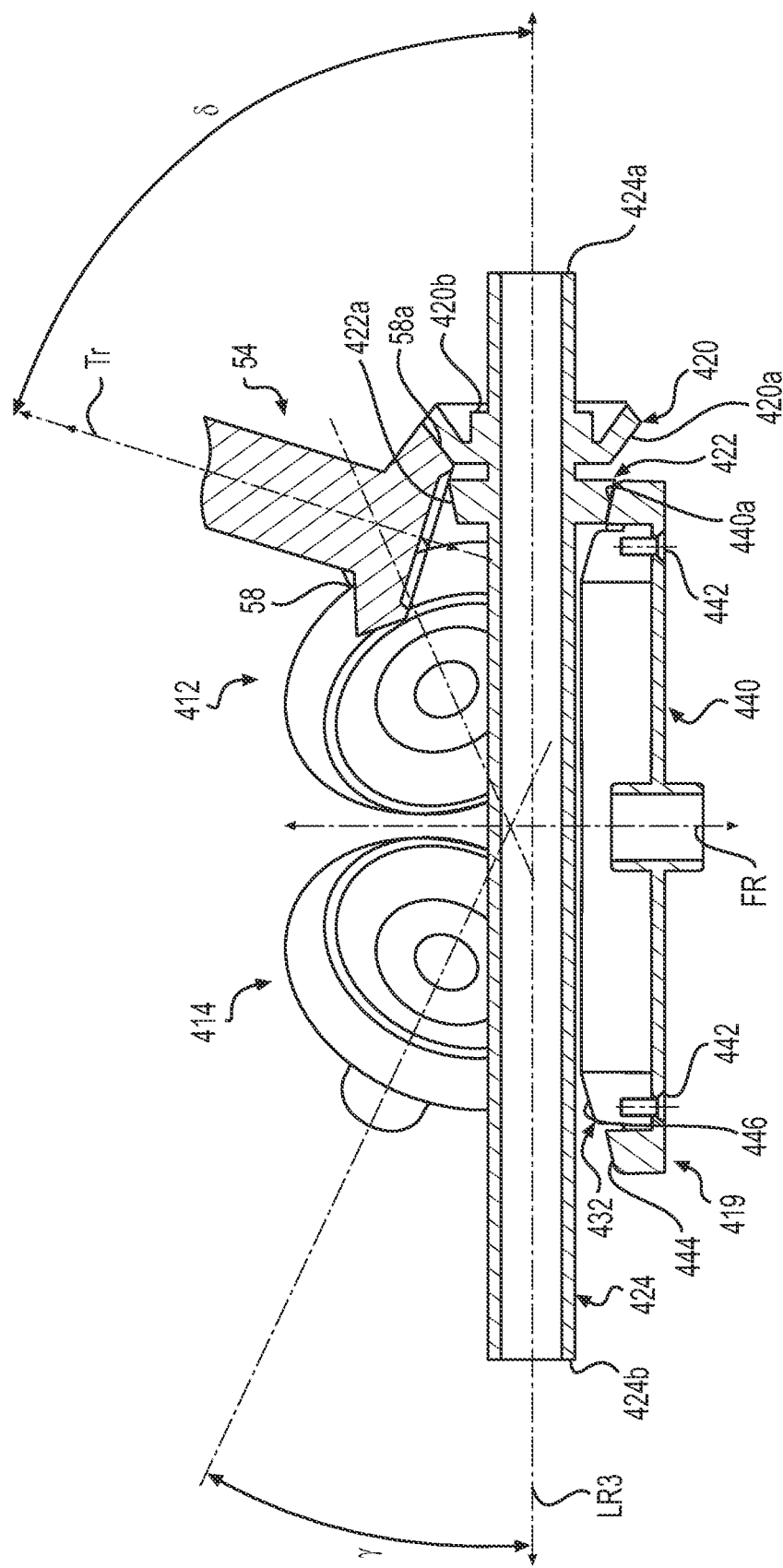
FIG. 17 is a cross-sectional view of the gear train of FIG. 16, taken along line 17-17 of FIG. 16.

With reference to FIG. 17, the shaft 410 has a shaft axis of rotation LR3, which is substantially transverse to the axis of rotation TR of the towershaft 54. In one example, the axis of rotation TR of the towershaft 54 is angularly offset from the shaft axis of rotation LR3 by an angle δ. The angle δ is about 53 degrees to about 93 degrees. With reference back to FIG. 16, the axis of rotation LR3 of the shaft 410 is substantially parallel to the axis of rotation R of the gas turbine engine 10 (FIG. 1). The first accessory drive shaft 412 has a first accessory axis of rotation Rib, which is substantially transverse to the axis of rotation LR3 of the shaft 410. The second accessory drive shaft 414 has a second accessory axis of rotation R2$b$, which is substantially transverse to the axis of rotation LR3 of the shaft 410, and substantially transverse to the first accessory axis of rotation R1$b$. The third accessory drive shaft 416 has a third accessory axis of rotation R3$b$, which is substantially transverse to the axis of rotation LR3 of the shaft 410, and is substantially parallel to the first accessory axis of rotation R1$b$. The third accessory axis of rotation R3$b$ is also substantially transverse to the second accessory axis of rotation R2$b$. The fourth accessory drive shaft 418 has a fourth accessory axis of rotation R4$b$, which is substantially transverse to the axis of rotation LR3 of the shaft 410, and is substantially transverse to the third accessory axis of rotation R3$b$. The fourth accessory axis of rotation R4$b$ is substantially transverse to the first accessory axis of rotation R1$b$. The fourth accessory axis of rotation R4$b$ is substantially parallel to the second axis of rotation R2$b$. Each of the first accessory axis of rotation Rib, the second accessory axis of rotation R2$b$, the third accessory axis of rotation R3$b$ and the fourth accessory axis of rotation R4$b$ define the centerlines for the respective accessory drive shafts 412-418. The shaft axis of rotation LR3 defines the central axis for the shaft 410. Further, in this example, the first accessory axis of rotation Rib, the second accessory axis of rotation R2$b$, the third accessory axis of rotation R3$b$ and the fourth accessory axis of rotation R4$b$ intersect at a single point P3 along the axis of rotation RL3 of the shaft 410.

The first accessory axis of rotation R1$b$ is spaced apart from the second accessory axis of rotation R2$b$ by an angle $\alpha 2$. In one example, the angle $\alpha 2$ is about 60 degrees to about 80 degrees. Similarly, the third accessory axis of rotation R3$b$ is spaced apart from the fourth accessory axis of rotation R4 by the angle $\alpha 2$. The second accessory axis of rotation R2$b$ is spaced apart from the shaft axis of rotation LR3 by an angle $\beta 2$. In one example, the angle $\beta 2$ is about 45 degrees to about 65 degrees. Similarly, the third accessory axis of rotation R3$b$ is spaced apart from the shaft axis of rotation LR3 by the angle $\beta 2$. Thus, the accessory drive shafts 412-418 are generally spaced apart in a substantially circular manner, which results in the placement of the accessories 62-74 substantially circumferentially about the gear case 404, allowing for a reduction in a space required in the engine nacelle N for the accessories 62-74. One or more of the accessory axes of rotation R1$b$-R4$b$ may also be angled relative to the shaft axis of rotation LR3, if desired. For example, with reference to FIG. 17, the axes of rotation R1$b$-R4$b$ may be angled at an angle γ relative to the shaft axis of rotation LR3. In one example, the angle γ comprises about 15 to about 35 degrees.

With reference to FIG. 17, the shaft 410 is directly coupled to the towershaft 54, and comprises a high speed shaft. For example, the shaft 410 rotates at about 18,500 revolutions per minute (rpm). The shaft 410 includes a first shaft gear 420 and a second shaft gear 422 each arranged on and coupled to a body 424 of the shaft 410. It should be noted that while the first shaft gear 420 and the second shaft gear 422 are illustrated herein as being integrally formed with the shaft 410, one or more of the first shaft gear 420 and the second shaft gear 422 may be formed separately and coupled to the body 424 of the shaft 410. The first shaft gear 420, second shaft gear 422 and the body 424 are generally formed of a metal or metal alloy, and may be cast, machined, forged, etc. In this example, the first shaft gear 420 comprises a bevel gear and the second shaft gear 422 comprises a bevel pinion gear. Each of the first shaft gear 420 and the second shaft gear 422 have a respective plurality of bevel gear teeth 420$a$, 422$a$ (gear teeth are not illustrated in FIGS. 16 and 17 for clarity). The plurality of bevel gear teeth 420$a$, 422$a$ are defined about a perimeter or circumference of each of the shaft gears 420, 422. The plurality of bevel gear teeth 420$a$ of the first shaft gear 420 are coupled to and meshingly engage with the plurality of bevel gear teeth 58$a$ of the gear 58 of the towershaft 54. The plurality of bevel gear teeth 422$a$ (or plurality of spur gear teeth) of the second shaft gear 422 are coupled to and meshingly engage with a plurality of bevel gear (or spur gear) teeth 440*a* of the gear set 419. In one example, the first shaft gear 420 also includes a projection 420*b*, which aids in coupling the shaft 410 to the gear case 404, while setting the correct spacing between the gear case 404 and the rotating shaft 410 and sleeve 55. It should be noted that while the second shaft gear 422 is described and illustrated herein as a bevel gear that meshingly engages with the plurality of bevel gear teeth 440*a* of a face gear 440 of the gear set 419, in various embodiments, the second shaft gear 422 can be a spur gear that meshingly engages with a plurality of spur gear teeth 440*a* of a face 444 of a face gear 440 of the gear set 419.

The body 424 of the shaft 410 includes a first end 424*a* opposite a second end 424*b*. Generally, the first shaft gear 420 and the second shaft gear 422 are coupled near the first end 424*a* of the body 424. The starter turbine 64 is coupled to the first end 424*a*, and the DC generator 66 is coupled to the second end 424*b* (FIG. 15).

With reference back to FIG. 16, each of the first accessory drive shaft 412, second accessory drive shaft 414, third accessory drive shaft 416 and the fourth accessory drive shaft 418 are composed of a suitable metal or metal alloy, and may be cast, machined, forged, etc. The first accessory drive shaft 412 includes a first accessory gear 430 defined about a first end 412*a* of the first accessory drive shaft 412. The first accessory gear 430 is composed of a suitable metal or metal alloy, and may be cast, machined, forged, etc. and coupled to the first accessory drive shaft 412. Further, the first accessory gear 430 may be integrally formed with the first accessory drive shaft 412. The first accessory gear 430 comprises a bevel gear that includes a plurality of bevel gear teeth 430*a*. The plurality of bevel gear teeth 430*a* are defined about a perimeter or circumference of the first accessory gear 430, and the plurality of bevel gear teeth 430*a* meshingly engage a plurality of bevel gear teeth 432*a* of a bevel gear 432 of the gear set 419. The first accessory drive shaft 412 comprises a lower speed drive shaft, and is driven to rotate at about 8,500 rpm. Stated another way, the first accessory drive shaft 412 rotates at a speed, which is different than a rotational speed of the shaft 410 and is generally less than the rotational speed of the shaft 410. The first accessory drive shaft 412 is coupled to the fuel control unit 72 at a second end 412*b*.

The second accessory drive shaft 414 includes the second accessory gear 434 defined about a first end 414*a* of the second accessory drive shaft 414. The second accessory gear 434 is composed of a suitable metal or metal alloy, and may be cast, machined, forged, etc. and coupled to the second accessory drive shaft 414. Further, the second accessory gear 434 may be integrally formed with the second accessory drive shaft 414. The second accessory gear 434 comprises a bevel gear that includes a plurality of bevel gear teeth 434*a*. The plurality of bevel gear teeth 434*a* are defined about a perimeter or circumference of the second accessory gear 434, and the plurality of bevel gear teeth 434*a* meshingly engages the plurality of bevel gear teeth 432*a* of the bevel gear 432. The second accessory drive shaft 414 comprises a lower speed drive shaft, and is driven to rotate at about 8,500 rpm. Stated another way, the second accessory drive shaft 414 rotates at a speed, which is different than the rotational speed of the shaft 410 and is generally about the same as the rotational speed of the first accessory drive shaft 412. The second accessory drive shaft 414 is coupled to the permanent magnet alternator 70 at a second end 414*b*.

The third accessory drive shaft 416 includes the third accessory gear 436 defined about a first end 416*a* of the third accessory drive shaft 416. The third accessory gear 436 is composed of a suitable metal or metal alloy, and may be cast, machined, forged, etc. and coupled to the third accessory drive shaft 416. Further, the third accessory gear 436 may be integrally formed with the third accessory drive shaft 416. The third accessory gear 436 comprises a bevel gear that includes a plurality of bevel gear teeth 436*a*. The plurality of bevel gear teeth 436*a* are defined about a perimeter or circumference of the third accessory gear 436, and the plurality of bevel gear teeth 436*a* meshingly engages the plurality of bevel gear teeth 432*a* of the bevel gear 432. The third accessory drive shaft 416 comprises a lower speed drive shaft, and is driven to rotate at about 8,500 rpm, similar to the second accessory drive shaft 414. The third accessory drive shaft 416 is coupled to the lubrication pump 74 at a second end 416*b*.

The fourth accessory drive shaft 418 includes the fourth accessory gear 438 defined about a first end 418*a* of the fourth accessory drive shaft 418. The fourth accessory gear 438 is composed of a suitable metal or metal alloy, and may be cast, machined, forged, etc. and coupled to the fourth accessory drive shaft 418. Further, the fourth accessory gear 438 may be integrally formed with the fourth accessory drive shaft 418. The fourth accessory gear 438 comprises a bevel gear or spur gear that includes a plurality of bevel gear (or spur gear) teeth 438*a*. The plurality of bevel gear (or spur gear) teeth 438*a* are defined about a perimeter or circumference of the fourth accessory gear 438, and the plurality of bevel gear (or spur gear) teeth 438*a* meshingly engages the plurality of bevel gear (or spur gear) teeth 440*a* of the face gear 440 of the gear set 419. The fourth accessory drive shaft 418 comprises a high speed drive shaft, and is driven to rotate at about 18,500 rpm. Stated another way, the fourth accessory drive shaft 418 rotates at a speed, which is about the same as the rotational speed of the shaft 410. Thus, the fourth accessory gear 438 has a diameter, which is different or less than a diameter of the first accessory gear 430, second accessory gear 434 and third accessory gear 436. The fourth accessory drive shaft 418 is coupled to the hydraulic pump 68 at a second end 418*b*.

The gear set 419 includes the face gear 440 and the bevel gear 432. The face gear 440 can comprise a face gear having spur gear teeth, or can comprise a bevel gear having bevel gear teeth. Generally, each of the face gear 440 and the bevel gear 432 are annular or ring gears, which are composed of a metal or metal alloy. The face gear 440 and the bevel gear 432 may be formed using any suitable technique, such as casting, machining, forging, etc. In this example, the face gear 440 and the bevel gear 432 are fixedly coupled together for rotation and have a common axis of rotation FR. With reference to FIG. 17, the bevel gear 432 is coupled to the face gear 440 via one or more mechanical fasteners, such as bolts, screws, etc. which are received through one or more fastening bores 442 defined through the face gear 440 and defined partially through the bevel gear 432.

The face gear 440 is generally coupled outboard of the bevel gear 432, and thus, the face gear 440 defines an outer circumference for the gear set 419. The face gear 440 includes a face 444. The face 444 is generally defined along the outer circumference of the face gear 440 and faces the shaft 410. The plurality of bevel gear (or spur gear) teeth 440*a* are defined along the face 444, and extend substantially about an entirety of the face 444. The plurality of bevel gear (or spur gear) teeth 440*a* are coupled to or meshingly engage the plurality of bevel gear teeth 422*a* of the second shaft gear 422 such that the face gear 440, and thus, the bevel gear 432 are driven by the shaft 410. The plurality of bevel gear (or spur gear) teeth 440a are also coupled to or meshingly engage the plurality of bevel gear (or spur gear) teeth 438a of the fourth accessory gear 438 to drive the fourth accessory drive shaft 418.

The bevel gear 432 is generally coupled inboard of the face gear 440. The bevel gear 432 includes a second face 446. The second face 446 is generally defined along the outer circumference of the bevel gear 432 and faces the shaft 410. The plurality of bevel gear teeth 432a are defined along the second face 446, and extend substantially about an entirety of the second face 446. With reference FIG. 16, the plurality of bevel gear teeth 432a are coupled to or meshingly engage the plurality of bevel gear teeth 430a of the first accessory gear 430, and the plurality of bevel gear teeth 432a are coupled to or meshingly engage the plurality of bevel gear teeth 434a of the second accessory gear 434. The plurality of bevel gear teeth 432a are also coupled to or meshingly engage the plurality of bevel gear teeth 436a of the third accessory gear 436. Thus, the bevel gear 432 drives the first accessory drive shaft 412, the second accessory drive shaft 414 and the third accessory drive shaft 416.

Generally, with reference to FIG. 15, the gear case 404 is not filled with oil to lubricate the gear train 406. In this example, oil to lubricate the gear train 406 is provided through the lubrication channel 230 defined through the towershaft 54. In certain examples, oil or lubricating fluid for the compact accessory gearbox 402 is also received from an external oil tank (not shown).

In one example, in order to assemble the compact accessory gearbox 402, the first accessory drive shaft 412, the second accessory drive shaft 414, the third accessory drive shaft 416 and the fourth accessory drive shaft 418 are each positioned through a respective one of the plurality of apertures 408 defined through the gear case 404. One or more bearing assemblies are coupled to each of the first accessory drive shaft 412, the second accessory drive shaft 414, the third accessory drive shaft 416 and the fourth accessory drive shaft 418, and are slid over the respective second ends 412b, 414b, 416b, 418b until the bearing assembly is properly positioned. A plurality of mechanical fasteners may be used to couple the bearing assemblies to the gear case 404, thereby coupling the first accessory drive shaft 412, the second accessory drive shaft 414, the third accessory drive shaft 416 and the fourth accessory drive shaft 418 to the gear case 404.

The shaft 410 is inserted through the respective aperture 408 until the fourth shaft gear 166 contacts a surface of the gear case 404. A bearing assembly may be slid over the first end 424a of the body 424 (FIG. 17). A plurality of mechanical fasteners may be used to couple the bearing assembly 130, and thus, the shaft 410 to the gear case 404. With the face gear 440 coupled to the bevel gear 432 via the fastening bores 442 (FIG. 17), the gear set 419 is positioned such that the face gear 440 is coupled to the sleeve 55 and the fourth accessory drive shaft 418; and the bevel gear 432 is coupled to the first accessory drive shaft 412, the second accessory drive shaft 414 and the third accessory drive shaft 416. The second portion of the gear case 404 is positioned over the gear set 419 and coupled to the first portion via one or more mechanical fasteners to enclose the gear case 404. With the gear case 404 assembled, the gear case 404 is coupled to the gas turbine engine 10 as discussed with regard to the compact accessory gearbox 60 of FIGS. 1-13. The compact accessory gearbox 402 has a volume that is about $\frac{1}{8}^{th}$ the size of a conventional gearbox, and provides about an 87 percent reduction in space required within the engine nacelle N for the compact accessory gearbox 402 when compared to a conventional gearbox.

In one example, with the high pressure driveshaft 46 driving or rotating the towershaft 54, the torque from the high pressure driveshaft 46 is transmitted through the towershaft 54 and into the gear train 406 via the meshing engagement of the gear 58 with the first shaft gear 420. Thus, the rotation of the towershaft 54 rotates the shaft 410 about the shaft axis of rotation LR3. The rotation of the shaft 410 drives or rotates the face gear 440. The rotation of the face gear 440 drives or rotates the fourth accessory drive shaft 418 (via the engagement between the face gear 440 and the fourth accessory gear 438); and drives or rotates the bevel gear 432. The rotation of the bevel gear 432 drives or rotates the first accessory drive shaft 412 (via the engagement between the bevel gear 432 and the first accessory gear 430); drives or rotates the second accessory drive shaft 414 (via the engagement between the bevel gear 432 and the second accessory gear 434); and drives or rotates the third accessory drive shaft 416 (via the engagement between the bevel gear 432 and the third accessory gear 436). The rotation of the drive shafts 412-418 provides input torque the respective accessories 72, 70, 74 and 68 for operating the respective accessories 72, 70, 74 and 68. The rotation of the shaft 410 also provides input torque to the DC generator 66 to operate the DC generator 66.

Prior to a start-up of the gas turbine engine 10, the starter valve 62 may direct pressurized air to the starter turbine 64. The starter turbine 64 rotates the shaft 410, and the engagement between the first shaft gear 420 and the gear 58 transmits the torque from the starter turbine 64 to the high pressure driveshaft 46, which causes the high pressure driveshaft 46 to rotate. The rotation of the high pressure driveshaft 46 drives the compressor 32 and the high pressure turbine 38, thereby enabling a start-up of the gas turbine engine 10.

It should be noted that the compact accessory gearbox 402 may be configured in various different ways. For example, with reference to FIG. 18, a simplified view of a gear train 500 for use with the compact accessory gearbox 402 is shown. As the gear train 500 is similar to the gear train 406 discussed with regard to FIGS. 15-17, only the differences between the gear train 406 and the gear train 500 will be discussed in detail herein, with the same reference numerals used to denote the same or substantially similar components. The gear train 500 can be employed with the compact accessory gearbox 402 in place of the gear train 406 to transmit torque from the towershaft 54 to the accessories 64-74.

Figure 18:
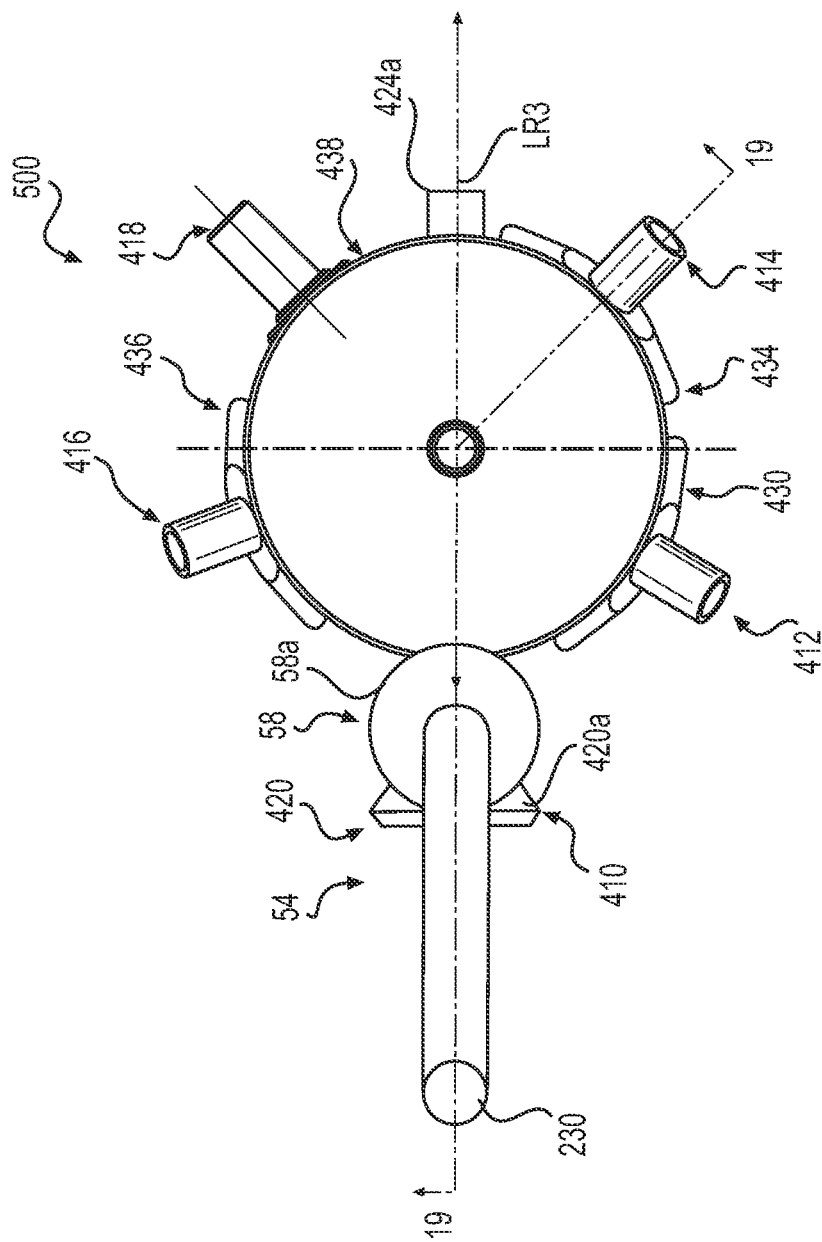
FIG. 18 is a top view of a gear train for use with the compact accessory gearbox of FIG. 15 in accordance with the various teachings of the present disclosure.
Figure 19:
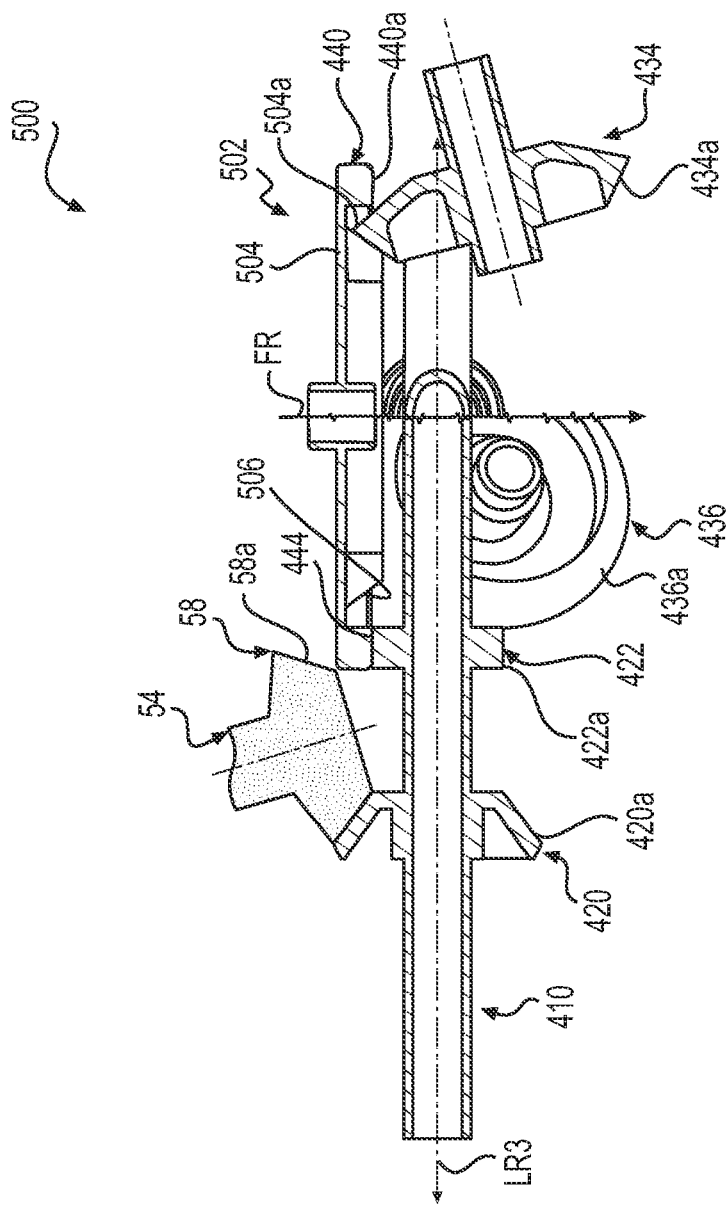
FIG. 19 is a cross-sectional view of the gear train of FIG. 18, taken along line 19-19 of FIG. 18.

In FIGS. 18 and 19, the gear train 500 is shown without the gear case 404 and the accessories 62-74 for clarity. It should be noted that the shape of the gear case 404 may be modified to accommodate the gear train 500. In this example, the gear train 500 includes the shaft 410, the first accessory drive shaft 412, the second accessory drive shaft 414, the third accessory drive shaft 416, the fourth accessory drive shaft 418 and a face gear set 502. In the example of FIGS. 18 and 19, the face gear set 502 is orientated about 180 degrees relative to the gear set 419 of the gear train 406 discussed with regard to FIGS. 15-17.

With reference to FIG. 19, the face gear set 502 includes the face gear 440 and a second bevel gear 504. The face gear 440 and the second bevel gear 504 are fixedly coupled together for rotation and have a common axis of rotation FR. The second bevel gear 504 is coupled to the face gear 440 via one or more mechanical fasteners, such as bolts, screws, etc. which are received through one or more fastening bores defined through the face gear 440 and defined partially through the second bevel gear 504.

The face gear 440 includes the plurality of bevel gear (or spur gear) teeth 440a defined along the face 444. The plurality of bevel gear (or spur gear) teeth 440a are coupled to or meshingly engage the plurality of bevel gear (or spur gear) teeth 422a of the second shaft gear 422 such that the face gear 440, and thus, the second bevel gear 504 are driven by the shaft 410. The plurality of bevel gear (or spur gear) teeth 440a are also coupled to or meshingly engage the plurality of bevel gear (or spur gear) teeth 438a of the fourth accessory gear 438 to drive the fourth accessory drive shaft 418 (FIG. 18).

The second bevel gear 504 is generally coupled inboard of the face gear 440, and is spaced a distance apart from the face gear 440 to provide clearance for the first accessory gear 430, the second accessory gear 434 and the third accessory gear 436 to interface with a second face 506 of the second bevel gear 504. The second face 506 is generally defined along a perimeter of the second bevel gear 504, such that the second face 506 faces a portion of the face gear 440. A plurality of bevel gear teeth 504a are defined along the second face 506, and extend substantially about an entirety of the second face 506. With reference to FIG. 18, the plurality of bevel gear teeth 504a are coupled to or meshingly engage the plurality of bevel gear teeth 430a of the first accessory gear 430, and the plurality of bevel gear teeth 504a are coupled to or meshingly engage the plurality of bevel gear teeth 434a of the second accessory gear 434. The plurality of bevel gear teeth 504a are also coupled to or meshingly engage the plurality of bevel gear teeth 436a of the third accessory gear 436. Thus, the second bevel gear 504 drives the first accessory drive shaft 412, the second accessory drive shaft 414 and the third accessory drive shaft 416.

In one example, in order to assemble the gear train 500 within the compact accessory gearbox 402, the first accessory drive shaft 412, the second accessory drive shaft 414, the third accessory drive shaft 416, the fourth accessory drive shaft 418 and the shaft 410 are coupled to the gear case 404 as discussed with regard to FIGS. 15-17, above. With the face gear 440 coupled to the second bevel gear 504 via the fastening bores, the face gear set 502 is positioned such that towershaft 54 is coupled to the shaft 410; the shaft 410 is coupled to the face gear 440; and the face gear 440 is coupled with the fourth accessory drive shaft 418; and the second bevel gear 504 is coupled to the first accessory drive shaft 412, the second accessory drive shaft 414 and the third accessory drive shaft 416. The gear case 404 is assembled, and the gear case 404 is coupled to the gas turbine engine 10 as discussed with regard to the compact accessory gearbox 60 of FIGS. 1-13.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An accessory system for a gas turbine engine having a driveshaft, the accessory system comprising:
    a towershaft coupled to the driveshaft and driven by the driveshaft, the towershaft including a towershaft bevel gear;
    a shaft including a first shaft bevel gear spaced apart from a second shaft bevel gear, and a third shaft bevel gear spaced apart from the second shaft bevel gear, the first shaft bevel gear coupled to the towershaft bevel gear, the shaft rotatable by the towershaft along a shaft axis of rotation;
    a first accessory drive shaft having a first accessory bevel gear driven by the second shaft bevel gear of the shaft, the first accessory drive shaft having a first accessory axis of rotation;
    a second accessory drive shaft having a second accessory bevel gear driven by the third shaft bevel gear of the shaft, the second accessory drive shaft having a second accessory axis of rotation, each of the first accessory axis of rotation and the second accessory axis of rotation substantially transverse to the shaft axis of rotation, and the second accessory axis of rotation and the first accessory axis of rotation are substantially transverse to each other;
    a third accessory drive shaft having a third accessory bevel gear driven by the first accessory bevel gear, the third accessory drive shaft has a third accessory axis of rotation, the third accessory axis of rotation is substantially transverse to the shaft axis of rotation and the first accessory axis of rotation; and
    a fourth accessory drive shaft having a fourth accessory bevel gear driven by the third accessory bevel gear and the fourth accessory drive shaft has a fourth accessory axis of rotation substantially parallel to the shaft axis of rotation.

2. The accessory system of claim 1, further comprising:
    a fifth accessory drive shaft having a fifth accessory bevel gear driven by the fourth accessory bevel gear.

3. The accessory system of claim 1, wherein the towershaft has an axis of rotation transverse to an axis of rotation of the driveshaft of the gas turbine engine, and the shaft axis of rotation is transverse to the towershaft axis of rotation and substantially parallel to the axis of rotation of the driveshaft of the gas turbine engine.

4. The accessory system of claim 1, wherein the first accessory axis of rotation, the second accessory axis of rotation, and the third accessory axis of rotation intersect at a single point along the shaft axis of rotation.

5. The accessory system of claim 1, wherein the first accessory drive shaft drives a lubrication pump, the third accessory drive shaft drives a fuel control unit, the fourth accessory drive shaft drives a permanent magnet alternator and the second accessory drive shaft drives a DC generator.

6. The accessory system of claim 1, wherein the fourth accessory bevel gear has a diameter, which is different than a diameter of the first accessory bevel gear.

7. The accessory system of claim 1, wherein the third accessory bevel gear has a diameter, which is different than a diameter of the second accessory bevel gear.

8. The accessory system of claim 1, wherein the first accessory bevel gear has a diameter, which is different than a diameter of the second accessory bevel gear.

9. An accessory system for a gas turbine engine having a driveshaft with an axis of rotation, the accessory system comprising:
   a towershaft coupled to the driveshaft and driven by the driveshaft, the towershaft including a towershaft bevel gear;
   a shaft including a first shaft bevel gear spaced apart from a second shaft bevel gear and a third shaft bevel gear spaced apart from the second shaft bevel gear, the first shaft bevel gear coupled to the towershaft bevel gear, the shaft rotatable by the towershaft along a shaft axis of rotation;
   a first accessory drive shaft having a first accessory bevel gear driven by the second shaft bevel gear of the shaft and the first accessory drive shaft has a first accessory axis of rotation;
   a second accessory drive shaft having a second accessory bevel gear driven by the third shaft bevel gear of the shaft, the second accessory drive shaft has a second accessory axis of rotation, each of the first accessory axis of rotation and the second accessory axis of rotation is substantially transverse to the shaft axis of rotation, and the second accessory axis of rotation and the first accessory axis of rotation are substantially transverse to each other;
   a third accessory drive shaft having a third accessory bevel gear driven by the first accessory bevel gear; and
   a fourth accessory drive shaft having a fourth accessory bevel gear driven by the third accessory bevel gear and the fourth accessory drive shaft has a fourth accessory axis of rotation substantially parallel to the shaft axis of rotation.

10. The accessory system of claim 9, wherein the towershaft has an axis of rotation transverse to the axis of rotation of the driveshaft of the gas turbine engine, and the shaft axis of rotation is transverse to the towershaft axis of rotation and substantially parallel to the axis of rotation of the driveshaft of the gas turbine engine.

11. The accessory system of claim 9, further comprising:
   a fifth accessory drive shaft having a fifth accessory bevel gear driven by the fourth accessory bevel gear, the fifth accessory drive shaft having a fifth accessory axis of rotation substantially transverse to the shaft axis of rotation and substantially transverse to the second accessory axis of rotation.

12. The accessory system of claim 11, wherein the third accessory drive shaft has a third accessory axis of rotation, the third accessory axis of rotation is substantially transverse to the first accessory axis of rotation, and the first accessory axis of rotation, the second accessory axis of rotation, the third accessory axis of rotation and the fifth accessory axis of rotation intersect at a single point along the shaft axis of rotation.

13. The accessory system of claim 9, wherein the first accessory drive shaft drives a lubrication pump, the third accessory drive shaft drives a fuel control unit, the fourth accessory drive shaft drives a permanent magnet alternator and the second accessory drive shaft drives a DC generator.

14. The accessory system of claim 9, wherein the fourth accessory bevel gear has a diameter, which is different than a diameter of the first accessory bevel gear.

15. The accessory system of claim 9, wherein the third accessory bevel gear has a diameter, which is different than a diameter of the second accessory bevel gear.

16. The accessory system of claim 9, wherein the first accessory bevel gear has a diameter, which is different than a diameter of the second accessory bevel gear.

* * * * *